(12) United States Patent
Takeda et al.

(10) Patent No.: US 7,113,240 B2
(45) Date of Patent: Sep. 26, 2006

(54) LIQUID CRYSTAL DISPLAY DEVICE HAVING INSULATING PATTERNS WITH WIDTH LARGER THAN GAP IN BETWEEN

(75) Inventors: Arihiro Takeda, Kawasaki (JP); Yoshio Koike, Kawasaki (JP); Takashi Sasabayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/886,636

(22) Filed: Jun. 21, 2001

(65) Prior Publication Data

US 2001/0050742 A1    Dec. 13, 2001

Related U.S. Application Data

(63) Continuation of application No. PCT/JP99/06737, filed on Dec. 1, 1999.

(30) Foreign Application Priority Data

Dec. 24, 1998    (JP) .................. 10-368092

(51) Int. Cl.
*G02F 1/1333*    (2006.01)
(52) U.S. Cl. ............... 349/138; 349/129; 349/139; 349/141
(58) Field of Classification Search .......... 349/117, 349/123, 141, 136, 138, 130, 129, 128, 139
See application file for complete search history.

(56) References Cited

U.S. PATENT DOCUMENTS

| | | | | |
|---|---|---|---|---|
| 5,309,264 | A | 5/1994 | Lien et al. ................ 359/87 |
| 5,434,690 | A * | 7/1995 | Hisatake et al. ........... 349/136 |
| 5,790,218 | A * | 8/1998 | Koden et al. .............. 349/92 |
| 6,256,082 | B1 * | 7/2001 | Suzuki et al. ............. 349/117 |
| 6,341,004 | B1 * | 1/2002 | Kondo et al. ............. 349/141 |
| 6,362,864 | B1 * | 3/2002 | Koma et al. .............. 349/123 |
| 6,657,695 | B1 * | 12/2003 | Song et al. ............... 349/143 |
| 6,671,025 | B1 * | 12/2003 | Ikeda et al. .............. 349/156 |
| 2002/0008827 | A1 * | 1/2002 | Yoo et al. ................. 349/141 |

FOREIGN PATENT DOCUMENTS

| | | |
|---|---|---|
| EP | 636 917 | 2/1995 |
| JP | 53-048542 | 5/1978 |
| JP | 01-120528 | 5/1989 |
| JP | 5-45636 | 2/1993 |
| JP | 6-43461 | 2/1994 |
| JP | 6-130394 | 5/1994 |
| JP | 6-273781 | 9/1994 |
| JP | 7-43698 | 2/1995 |
| JP | 7-43719 | 2/1995 |

(Continued)

OTHER PUBLICATIONS

Multi-Domain Verticalli Aligned Mode, V.A.Konovalov, SID, May 17-22, 1998, p. 1127-1130.*

(Continued)

*Primary Examiner*—Andrew Schechter
*Assistant Examiner*—George Y. Wang
(74) *Attorney, Agent, or Firm*—Greer, Burns & Crain, Ltd.

(57) ABSTRACT

A liquid crystal display device in which a pair of substrates having electrodes face each other, and liquid crystal is sealed between the substrates. The liquid crystal display device includes a insulating layer that varies electric field orientations in a pixel region when a voltage is applied between the pair of substrates.

24 Claims, 26 Drawing Sheets

FOREIGN PATENT DOCUMENTS

| | | |
|---|---|---|
| JP | 8-50281 | 2/1996 |
| JP | 8-179344 | 7/1996 |
| JP | 8-262444 | 10/1996 |
| JP | 10-96929 | 4/1998 |

OTHER PUBLICATIONS

V.A.Konovalov et al. "Multi-domain Vertcally Aligned Mode", SID, May 17-22, 1998, ☐☐pp. 1127-1130.*

* cited by examiner

PRIOR ART (A) 3.0V
(B) 5.0V
(C) 8.0V
(D) 10.48V (A) 3.0V
(B) 5.0V
(C) 8.0V
(D) 10.48V (A) 3.0V
(B) 5.0V
(C) 8.0V
(D) 10.48V

PRIOR ART

LIQUID CRYSTAL DISPLAY DEVICE HAVING INSULATING PATTERNS WITH WIDTH LARGER THAN GAP IN BETWEEN

This is a continuation of International Application Ser. No. PCT/JP99/06737 filed Dec. 1, 1999.

TECHNICAL FIELD

The present invention generally relates to liquid crystal display devices, and, more particularly, to a liquid crystal display device that has liquid crystal sealed between a first transparent substrate and a second transparent substrate.

BACKGROUND ART

In recent years, liquid crystal display devices have been widely used because of their advantageous features, such as thinness, lightness, low driving voltage, and low power consumption. Particularly, active-matrix liquid crystal display devices having an active element for each pixel, such as TFT-LCDs (Thin Film Transistor Liquid Crystal Displays) have been becoming comparable with CRTs in terms of display quality.

However, the use of LCDs has been limited due to a narrow viewing angle. In order to eliminate this problem, various techniques have been suggested. Among those techniques, there are many techniques in which electrodes are patterned so as to control the inclinations of liquid molecules in various directions by changing the field distribution in cells. However, the electrode patterning techniques cause problems described later herein. The present invention can be applied to all of the electrode patterning techniques, and easily solve those problems.

First, LCDs that are generally used for display devices will be described. At present, the most commonly used LCDS are TN (Twisted Nematic) LCDs of normally white mode. FIG. 1A shows the panel structure of such a TN-LCD. In FIG. 1A, TN liquid crystal 12 is sandwiched by glass substrates having alignment layers 10 and 11 having orientated directions deviated by 90 degrees from each other. Accordingly, the liquid crystal in contact with the alignment layers 10 and 11 are aligned in the orientated directions of the alignment layers, and the other liquid crystal molecules are orientated along the aligned liquid crystal molecules. As a result, the molecules are twisted through 90 degrees. Further, the liquid crystal and the alignment layers 10 and 11 are sandwiched by two polarizing plates 13 and 14 that are situated in parallel with the orientated directions of the upper and lower portions of the liquid crystal, respectively. When light impinges on the panel having the above structure, the light passing through the polarizing plate 13 turns into linearly polarized light and enters the liquid crystal 12. Along with the liquid crystal 12 twisted through 90 degrees, the light is also twisted through 90 degrees while passing through the lower polarizing plate 14. Here, the display is in a bright state.

As shown in FIG. 1B a voltage is applied between the alignment layers 10 and 11, thereby straightening the liquid crystal molecules and eliminating the twist. However, on the surfaces of the alignment layers 10 and 11, the liquid crystal molecules remain along the alignment layers 10 and 11 due to the strong orientation force. In this situation, the liquid crystal 12 is almost homeotropic with the linearly polarized light, and no rotation of the polarizing direction occurs. Here, the display is in a dark state. When the voltage is zero, the display returns to a bright state due to the orientation force y on the alignment layers.

Next, an IPS (In-Plane Switching) method that realizes a wider viewing angle will be described. For instance, Japanese Patent No. 53-48542 and Japanese Patent No. 1-120528 disclose methods in which an electric field in parallel with the substrates is generated in liquid crystal layers. As shown in FIG. 2A, according to this method, a pair of striped electrodes 21 and 22 are formed on a substrate 20 on one side, and the liquid crystal molecules located between the slit-like electrodes 21 and 22 are driven by a lateral electric field. The liquid crystal 23 is made of a material having positive dielectric anisotropy. When no electric field is applied, the liquid crystal molecules are homogeneously aligned in parallel with the longitudinal direction of the striped electrodes 21 and 22, as shown in the plan view of FIG. 2B (i.e., the liquid crystal molecules are homogeneously orientated at an angle of approximately 15 degrees, so that the direction of the liquid crystal molecules becomes uniform when a voltage is applied).

When a voltage is applied between the striped electrodes 21 and 22, the directors of the liquid crystal molecules having dielectric anisotropy are changed, as shown in FIGS. 3A and 3B. In such a liquid crystal display device, polarizing plates 25 and 26 are arranged on and under substrates 20 and 24, with the polarizing axes or the absorbing axes crossing perpendicularly to each other. One of the polarizing axes is located in parallel director direction, so that a black display can be realized when no voltage is applied and a white display can be realized when a voltage is applied.

There have been dramatic improvements in the TN-type TFT-LCD production techniques, and, in recent years, the TN-type TFT-LCD production techniques excel CRTs in contrast ratio and color reproducibility. However, the LCDs have a narrow viewing angle. Particularly, a TN-type has only a very narrow viewing angle in the vertical direction. Viewed front sonic other direction, the brightness of the black state increases, making the image whitish. Viewed from the other direction, the display becomes dark, and gray-scale inversion occurs.

When a voltage is applied to TN liquid crystal cells, the liquid crystal molecules are inclined in some degree. At this point, the birefringence of the liquid crystal layer makes the cells have a gray scale transmittance. However, this is the case only when the liquid crystal panel is seen from the front, and the liquid crystal panel looks different when it is seen from an oblique angle. In FIG. 4, the appearance seen from the left is different from the appearance seen from the right. For instance, the liquid crystal has little birefringence effect on the light directed from the lower left to the upper right in FIG. 4. Accordingly, when seen from the right, the panel looks black, not gray. On the other hand, with the light passing from the lower right to the upper left, the birefringence effect becomes larger. As a result, the display looks even whitish and closer to white.

To solve this problem, it is effective to employ the technique of multidomain. According to this technique, a plurality of inclined directions of the liquid crystal molecules exist in one pixel. Because of this, the left half of the pixel in FIG. 5 exhibits a large birefringence for the light passing from the lower left to the upper right (white display), and the right half of the pixel exhibits little birefringence (white display). In such a condition, the display appears to be a gray scale image to a human eye, as long as the division size is small enough. When seen from the left, the display appears to be gray for the same reason. From seen from the front, the display of course appears to be gray because the inclined angles of the liquid crystal molecules are uniform on both left and right sides. Thus, uniform gray scale image can be obtained throughout a wider viewing angle range.

To achieve a multidomain structure, a mask rubbing process shown in FIG. 6 can be used. When an alignment layer is rubbed with a rubbing roller made of nylon or polyester, the liquid crystal molecules have tendency to be orientated in the rubbing direction. Taking advantage of this tendency, alignment layers 32 and 33 of substrates 30 and 31 are subjected to rubbing in the right direction by rubbing rollers 34 and 35, as shown in FIG. 6A. Next, a half of each pixel is subjected to masking with resists 36 and 37, as shown in FIG. 6B. The alignment layers 32 and 33 are then subjected to rubbing in the left direction, as shown in FIG. 6C. The resists 36 and 37 are then removed, and the substrates 30 and 31 are attached to each other, with liquid crystals inside, thereby completing a liquid crystal cell having the left and right orientation directions.

With the mask rubbing method, however, there exist many problems. These problems include the low productivity due to the complicated process, the limitation on the number of divisions (at least four divisions are necessary to satisfy all the conditions with respect to contrast, color, and gray scale, but the maximum number of divisions is 2 because of the complicated process), and poor controllability in the rubbing process due to the masking process. For these reasons, it has been very difficult to mass-produce the multidomain panels by the mask rubbing process.

Other techniques to solve the above problems and to achieve a wider viewing angle include a method in which an electric field distortion is caused in a cell so as to control the alignments. However, there are other problems in this case, such as the difficulty in patterning electrodes, poor yield, and higher costs due to a larger number of processes. Furthermore, if a minutely striped electrode is formed from an ITO (indium tin oxide) layer, a voltage drop is caused at the end portion of the electrode, resulting in display unevenness.

In the IPS method, the liquid crystal are switched in the horizontal direction. As mentioned before, when the liquid crystal molecules are aligned with an inclined angle to the substrates, the birefringence varies with the viewing angle direction. The switching is carried out in the horizontal direction so as to steady the birefringence and obtain excellent viewing angle characteristics. However, this method also causes several problems. First of all, the response is very slow, because the switching is carried out with an electrode gap of about 10 μm in the IPS method, compared with the switching with an electrode gap of about 5 μm in the conventional TN method. The response time can be shortened by narrowing the electrode gap, but each two adjacent electrodes needs to have a different electrical potential to apply an electrical field. Otherwise, short-circuiting will occur between the adjacent electrodes, resulting in a display with defects. To avoid such a problem, each two adjacent electrodes are formed on two different layers, but this simply increases the number of manufacturing processes.

Also, since it is difficult to form minutely striped electrode with ITO, striped metal electrodes are employed instead. However, this causes a loss in the aperture ratio. If the pitch of the striped electrode is narrowed to increase the response speed, the proportion of the electrode to the total area becomes large, resulting in lower transmittance. (In reality, the transmittance of the IPS method is only two thirds of the transmittance of the TN method. If the electrode pitch is halved and the density of the striped electrode is doubled, the transmittance becomes only one third of the transmittance of the TN method.) Because of the above reasons, the similar display quality (in terms of brightness) cannot be obtained, unless the brightness of the backlight is tripled, for instance.

In reality, when quickly moving dynamic images are displayed, blurring occurs in the images. Further, to increase the response speed, a panel is subjected to rubbing not in the direction of the electrode but in the direction deviated by for example about 15 degrees from the direction of the electrode. If the rubbing is performed in the direction of the electrode, the rotational direction of the liquid crystal molecules in the middle of the electrodes is not stabilized as one direction, resulting in a longer response time. Therefore, by inclining the rubbing direction by 15 degrees, even after this process, the response time is twice that of the TN type. Through this process, the viewing angle characteristics are not perfectly symmetric, and some gray-level inversion occurs around the rubbing direction.

To explain this situation, the coordinate system of a polar angle $\theta$ shown in FIG. 7A and the azimuth angle $\phi$ shown in FIG. 7B are determined for the substrates 20 and 24, the electrodes 21 and 22, and the liquid crystal molecules 23 shown in FIGS. 7A and 7B. FIG. 8A shows the viewing angle characteristics of the panel, in which the gray scales are divided into eight levels from the white state to the black state, and the brightness variations are analyzed by varying the polar angle and the azimuth angle. The shadowed portions in the figure represent gray-level inversion, which are caused in the two azimuths (the 45-degree ranges of 60 to 105 degrees and 240 to 285 degrees in the azimuth angle $\phi$). FIG. 8B shows the transmittance variations of the 8 gray-level displays with respect to the polar angle $\theta$ at an azimuth angle of 75 degrees, which causes inversion. The gray-level inversion is caused due to a drop in the white brightness.

In the IPS method, the gray-level inversion is caused due to a drop in the white brightness in the two azimuths, and the viewing angle characteristics deteriorate. By switching in the lateral direction, viewing angle characteristics equivalent to a multidomain panel, but the transmittance, the response speed, the productivity and the market price are all sacrificed. Particularly, a low response speed is not suitable for displaying dynamic picture images.

DISCLOSURE THE INVENTION

The principal object of the present invention is to provide a liquid crystal display device that exhibits improved viewing angle characteristics, restricts gray-level inversion, and has a short response time.

To achieve the above object, the present invention provides a liquid crystal display device that has a pair of substrates having electrodes facing each other, and has liquid crystal sealed between the substrates. The device includes an insulating layer that varies electric field orientations in a pixel region when a voltage is applied between the pair of substrates. Accordingly, the liquid crystal molecules become perpendicular to the lines of electric force (in a case of negative liquid crystal) or in parallel with the lines of electric force (in a case of positive liquid crystal). Because of the varied orientations of the electric force, a brightness variation becomes smaller when seen from any direction, and the viewing angle characteristics are improved. Furthermore, gray-level inversion can be restricted.

BRIEF DESCRIPTION OF THE DRAWINGS

The other objects, features, and advantages of the present invention will become more apparent from the following description, with reference to the accompanying drawings.

PREFERRED EMBODIMENTS FOR CARRYING OUT THE INVENTION

The following is a description of embodiments of the present invention, with reference to the accompanying drawings.

Figure 1:
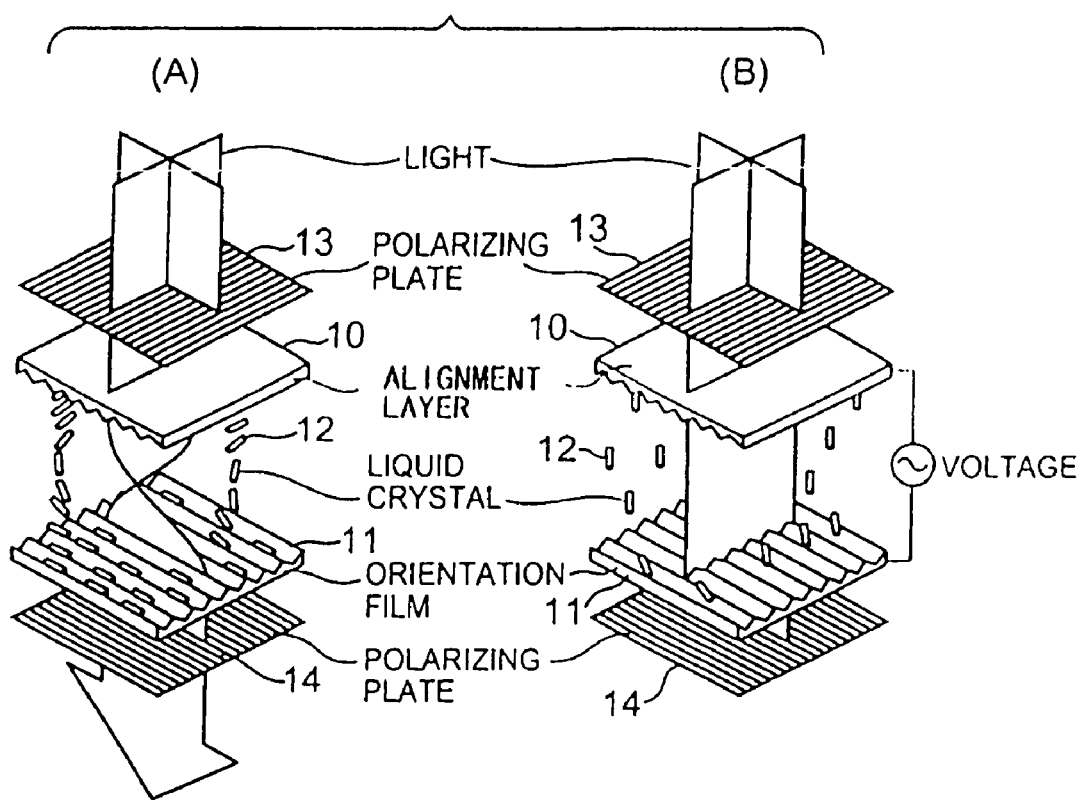
FIG. 1 shows the structure of a TN-type LCD panel.
Figure 2:
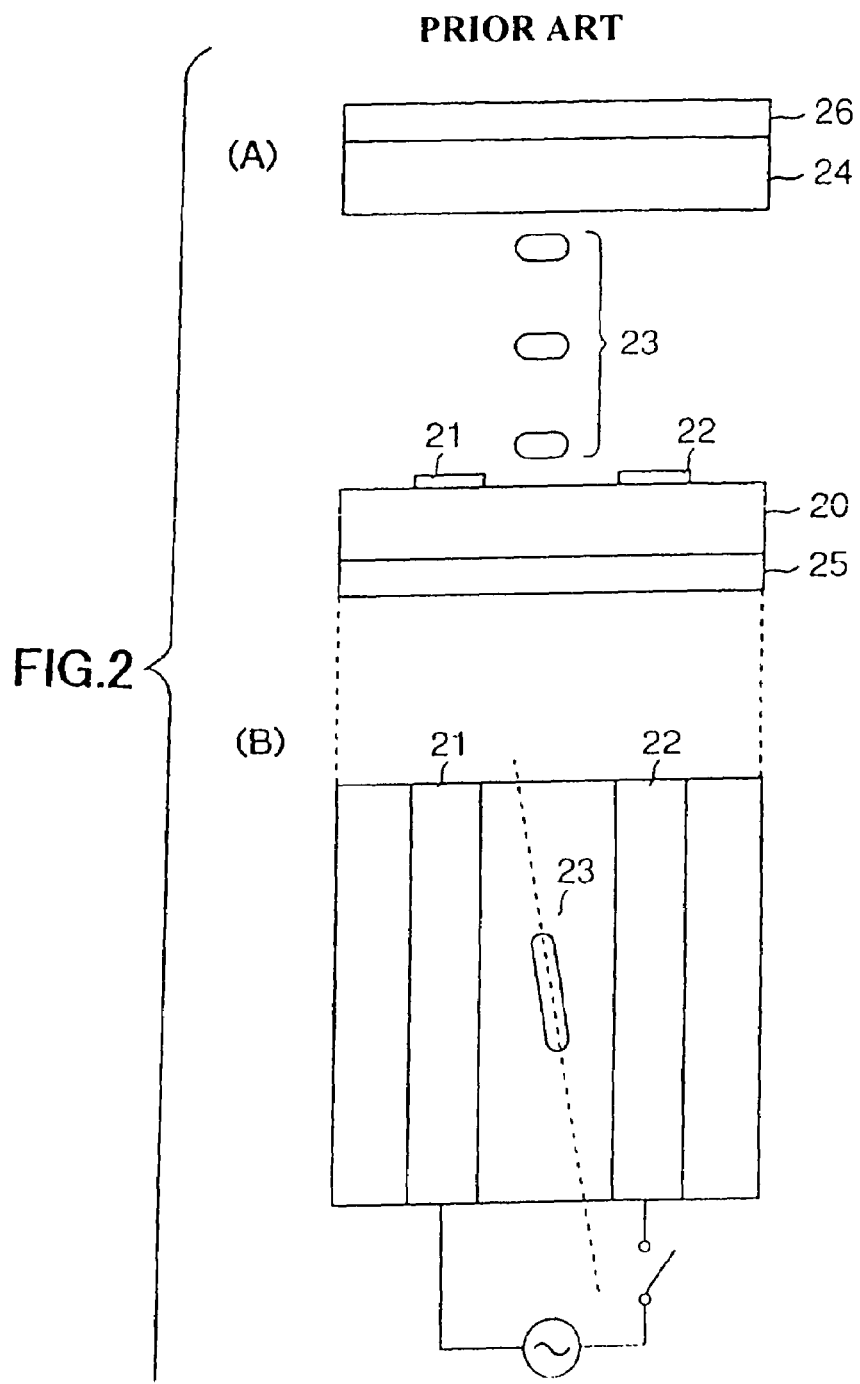
FIG. 2 shows the structure of an IPS-type LCD panel.
Figure 3:
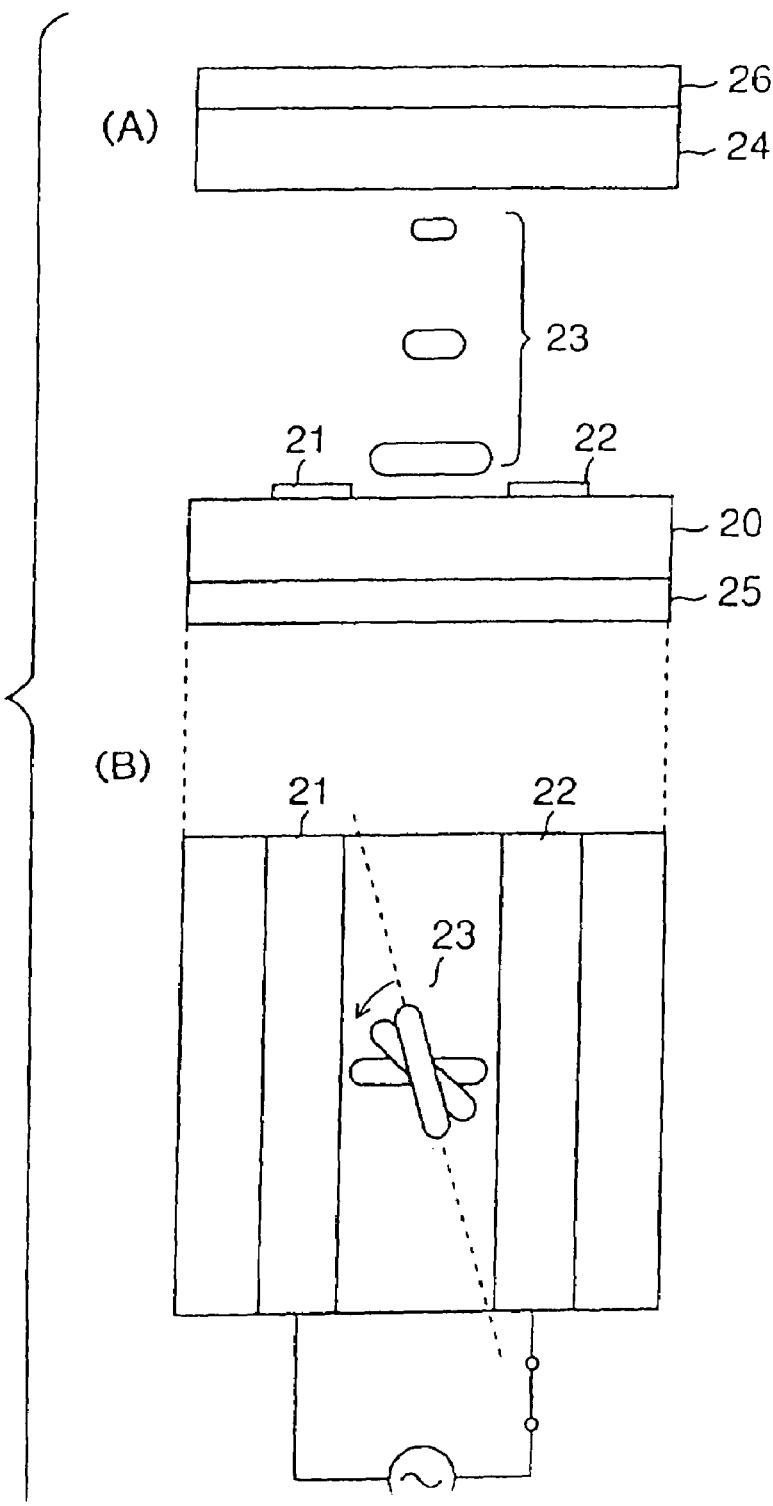
FIG. 3 shows the structure of the IPS-type LCD panel.
Figure 4:
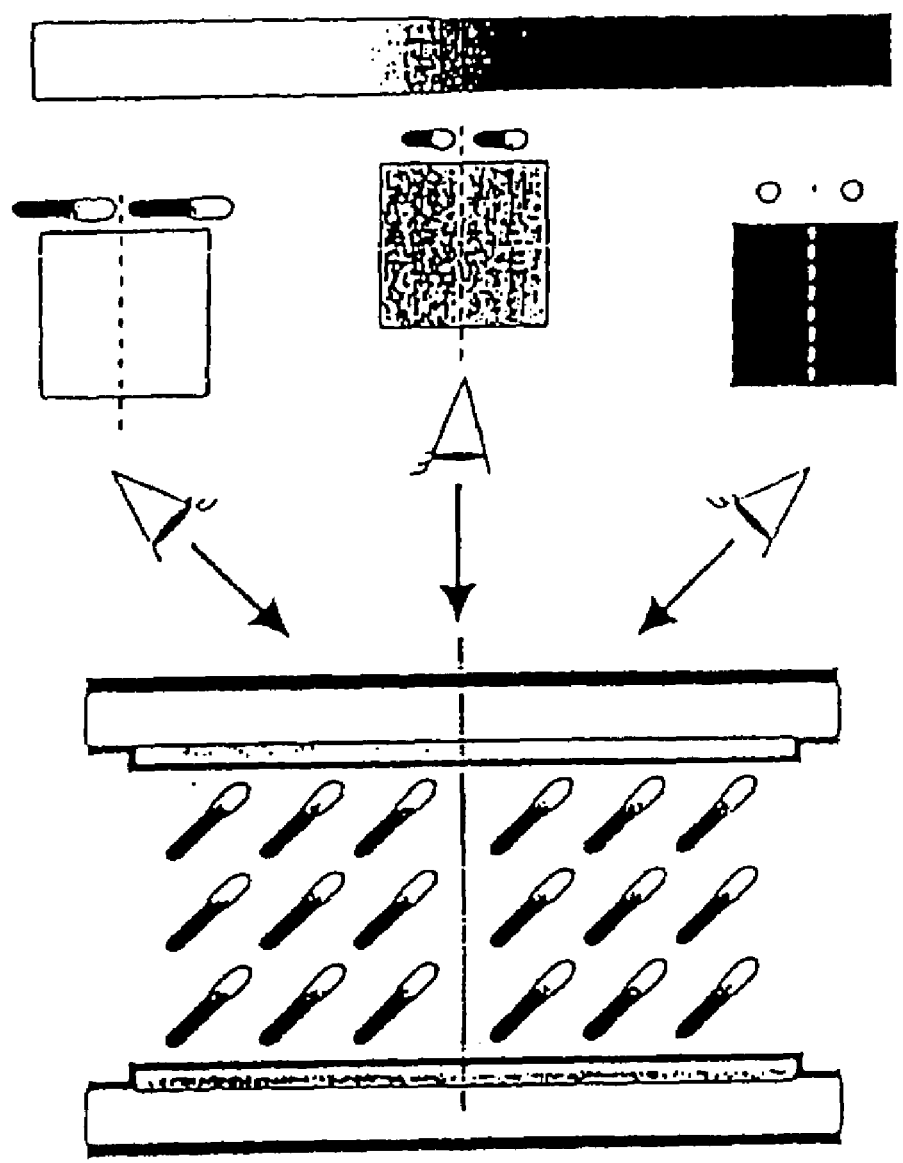
FIG. 4 illustrates the viewing angle dependence with a conventional device.
Figure 5:
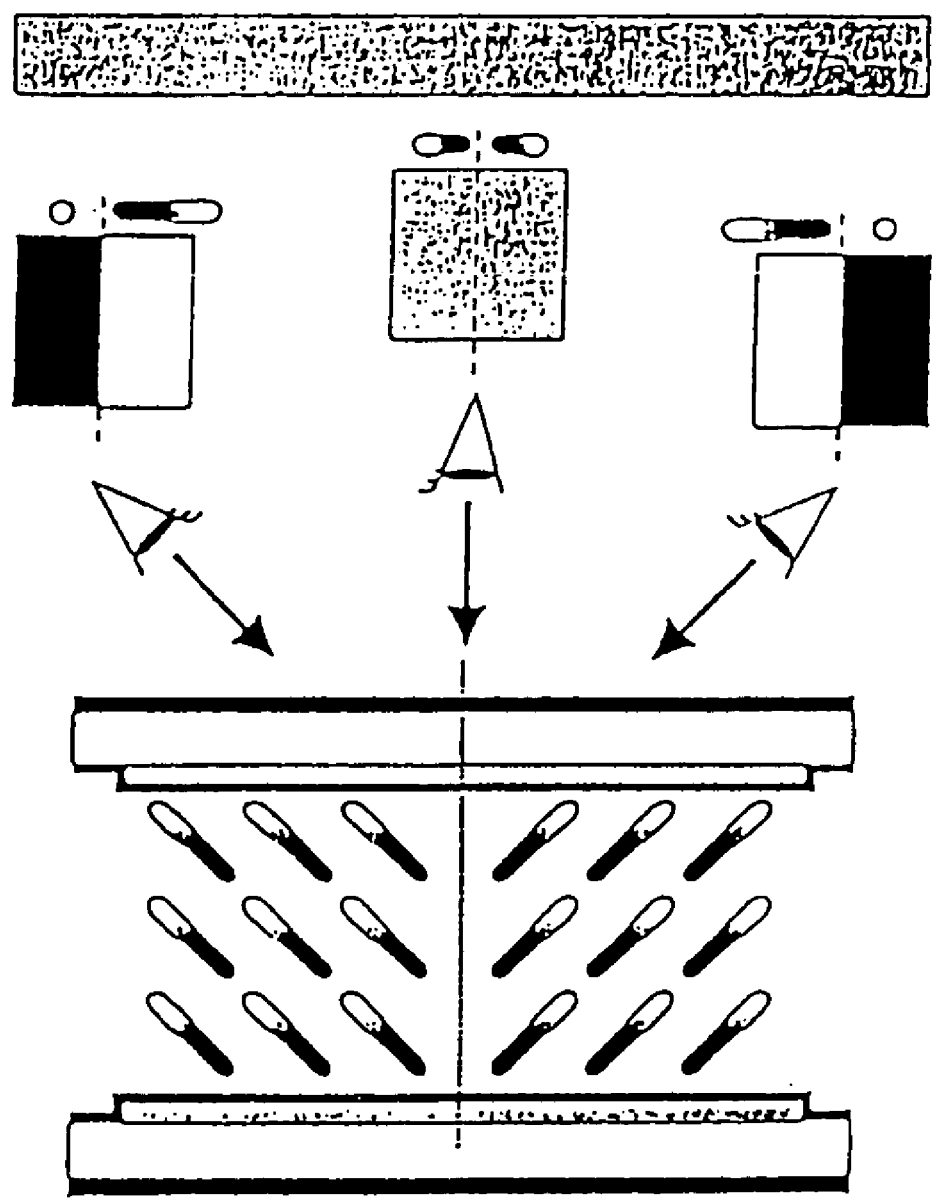
FIG. 5 illustrates a conventional multidomain structure and the viewing angle dependence.
Figure 6:
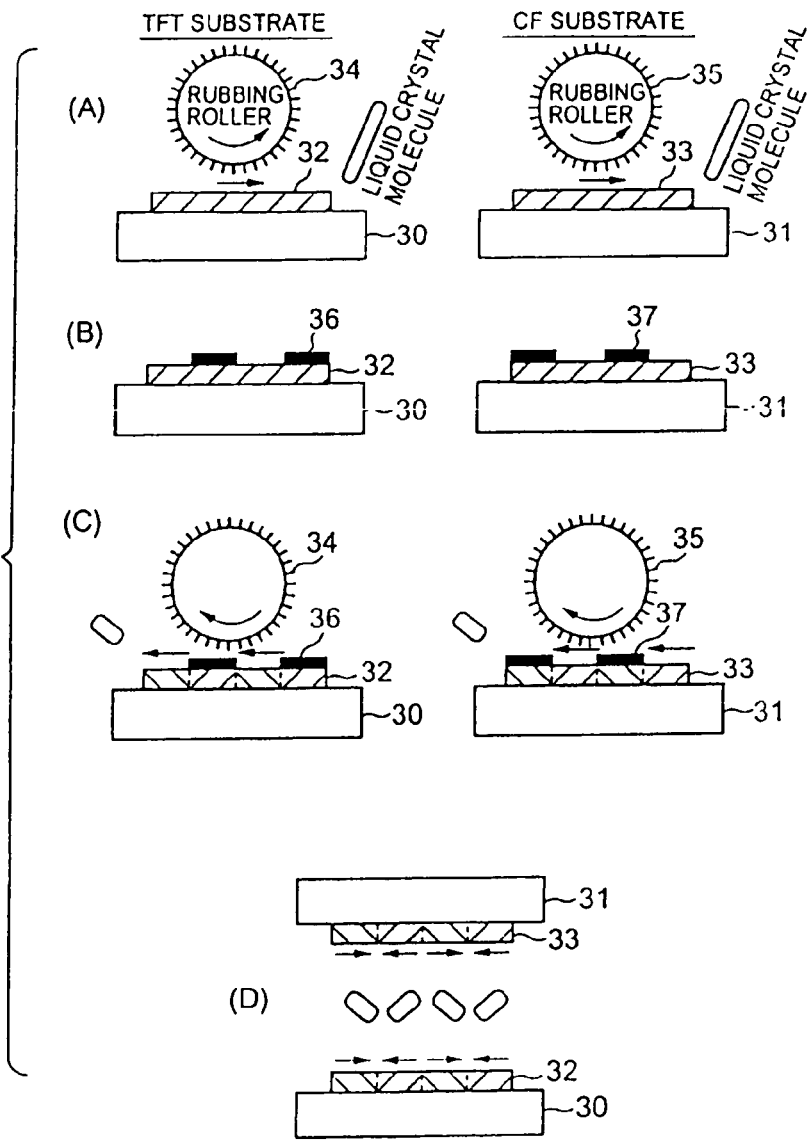
FIG. 6 illustrates a mask rubbing method.
Figure 7:
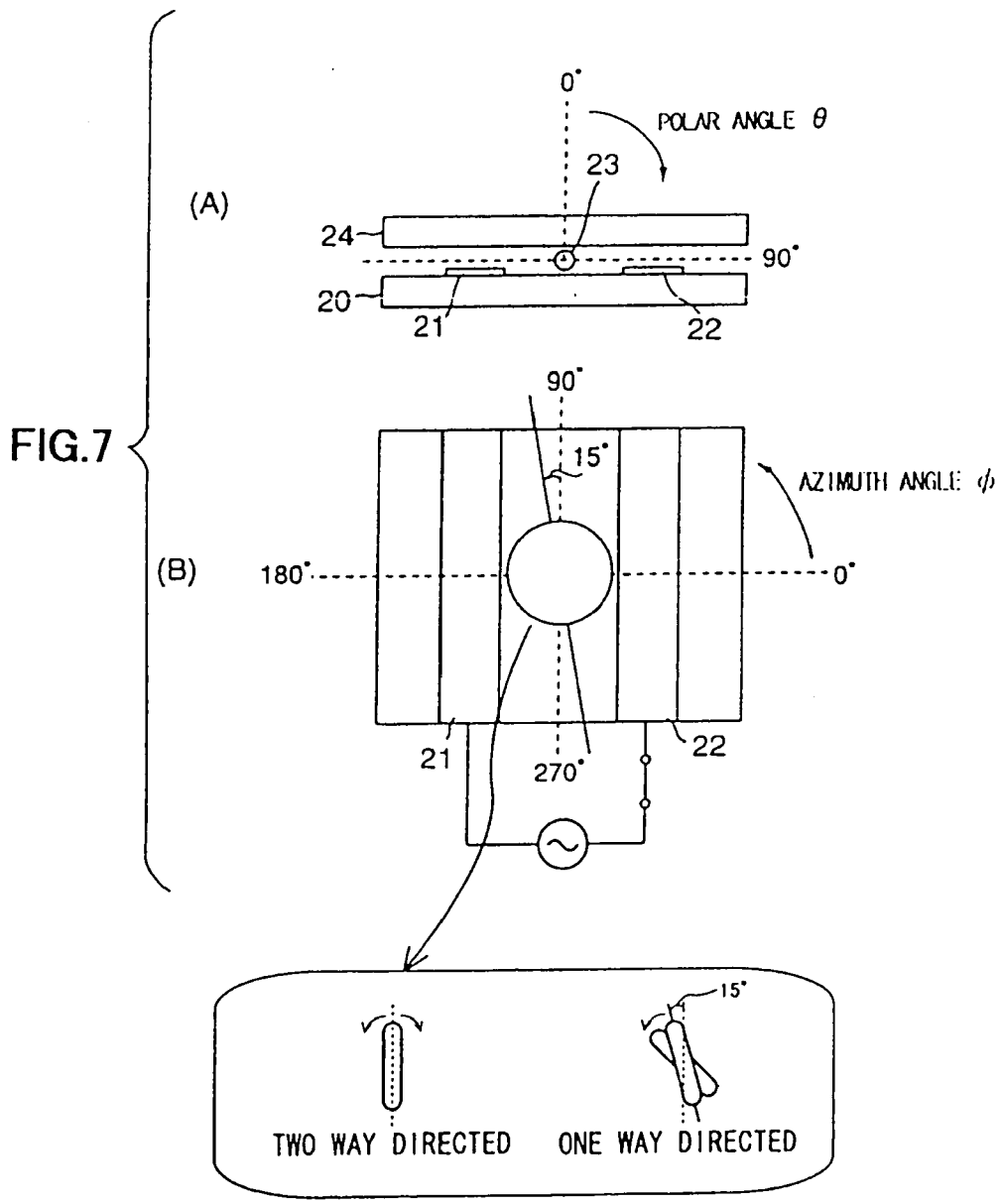
FIG. 7 illustrates the definition of polar angle θ and azimuth angle φ.
Figure 8:
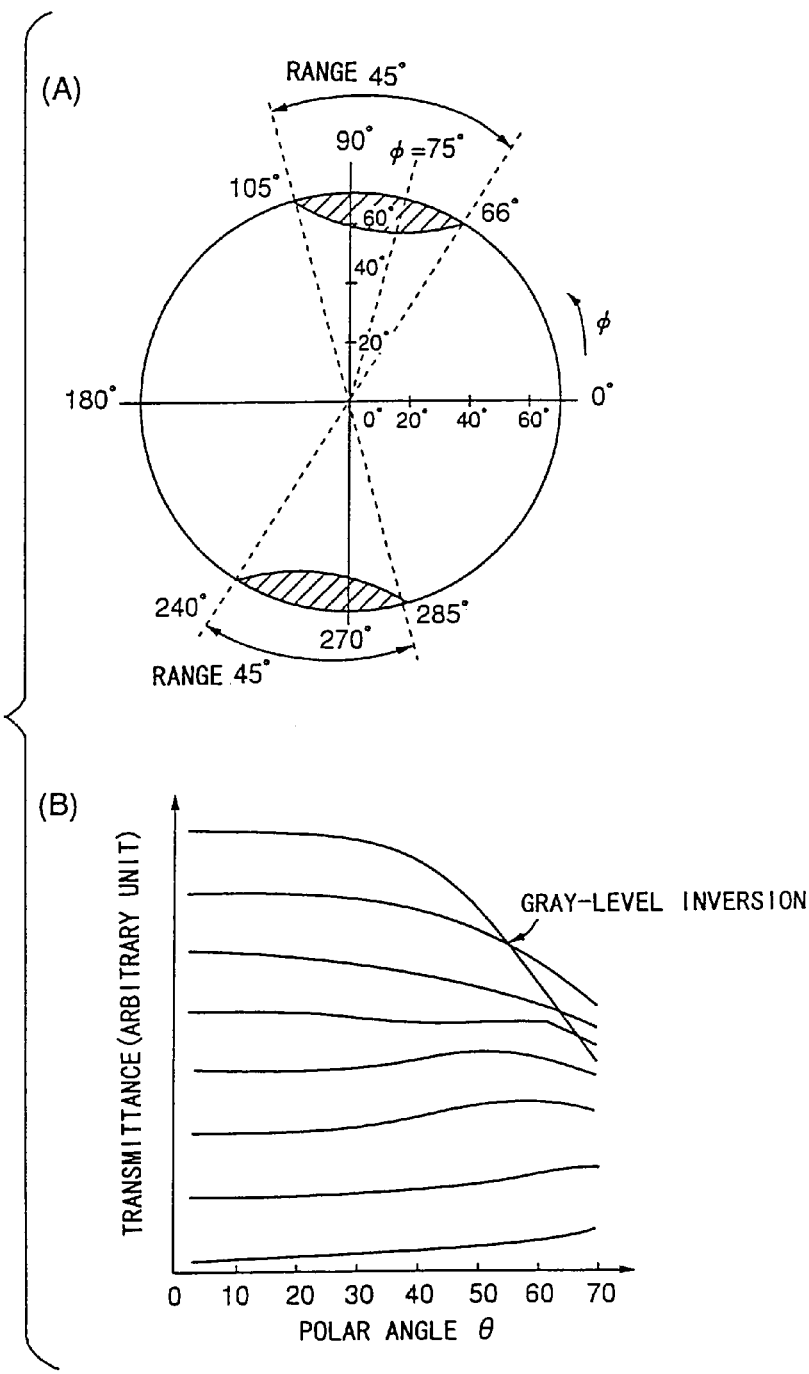
FIG. 8 illustrates gradation inversion.
Figure 9:
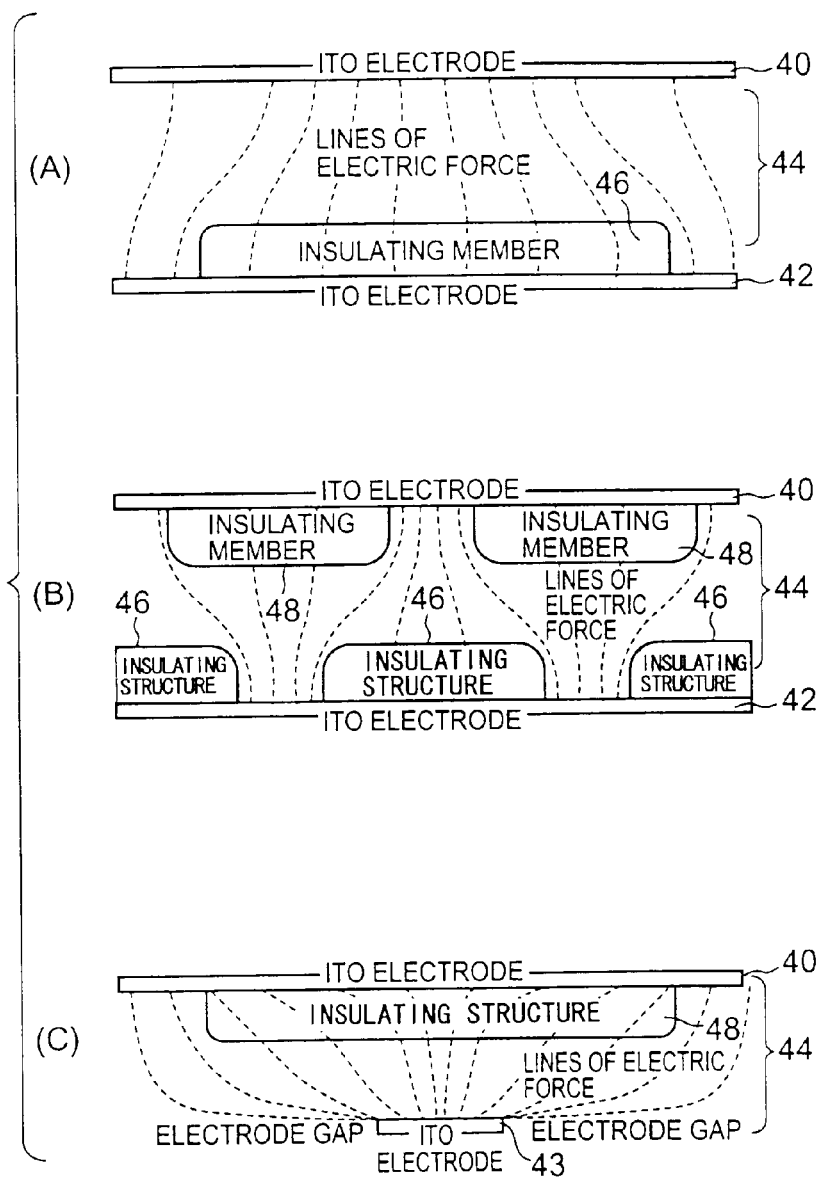
FIG. 9 is a sectional view illustrating the principles of the present invention.

FIGS. 9A, 9B, and 9C are sectional views for illustrating the principles of the present invention.

In FIG. 9A, an upper ITO electrode 40 faces a lower ITO electrode 42, with a space being maintained between the two electrodes 40 and 42, so that liquid crystal 44 is sealed between the two electrodes 40 and 42. A transparent insulating film 46 as a dielectric insulating layer is formed on the lower ITO electrode 42. A vertical alignment layer (not shown) is formed between the liquid crystal 44 and the upper ITO electrode 40 and between the liquid crystal 44 and the ITO electrode 42 (or the transparent insulating film 46).

In the structure shown in FIG. 9A, one transparent insulating film 46 substantially covers most of one pixel. The broken lines indicate the lines of electric force when a voltage is applied between the ITO electrodes 40 and 42. Because of the insulating film 46 (preferably transparent), the lines of electric force incline in the direction perpendicular to the ITO electrode 40.

Figure 10:
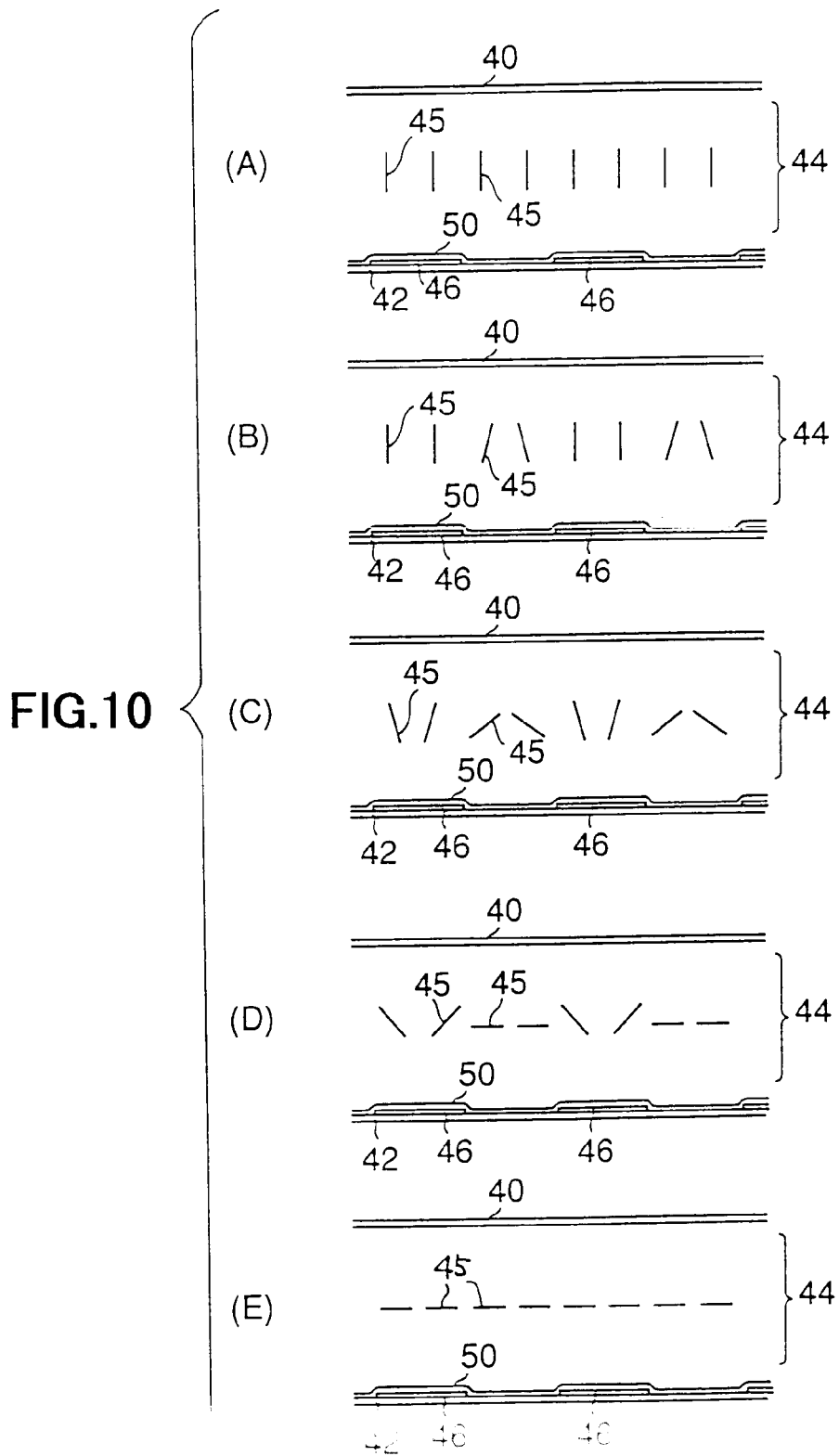
FIG. 10 illustrates the movement of liquid crystal molecules at a time of voltage application.

When no voltage is applied between the ITO electrodes 40 and 42, the liquid crystal molecules 45 of the liquid crystal 44 are orientated perpendicularly to the surface of the ITO electrode 40, as shown in FIG. 10A. FIG. 10 shows a vertical alignment layer 50 on the side of the transparent insulating films 46. When a voltage is applied between the ITO electrodes 40 and 42, the liquid crystal molecules 45 which are not covered with the transparent insulating films 46 start inclining along the inclination of the lines of electric force, as shown in FIG. 10B. If the applied voltage rises, the liquid crystal molecules 45 located at die transparent insulating films 46 start inclining, as shown in FIG. 10C. The liquid crystal molecules 45 then go through the stage shown in FIG. 10D. When the applied voltage becomes high enough, all the liquid crystal molecules 45 are almost parallel with the surface of the ITO electrode 40 while actually being orientated perpendicularly to the lines of the electric force.

By forming the insulating (preferably transparent) films 46 that vary the orientations of the electric field in a pxel region, die liquid crystal molecules become perpendicular to the lines of electric force created by the applied voltage. The orientations of the electric field vary, and a plurality of gradient orientations exist for the liquid crystal. As a result, the brightness variation becomes smaller over a wide range of viewing angles, and the viewing angle characteristics improve. Also, the occurrence of gradation inversion can be restricted.

In FIG. 9B, the upper ITO electrode 40 faces the lower ITO electrode 42, with a space being maintained, and the liquid crystal 44 is sealed therebetween. The transparent insulating films 46 are formed on the lower ITO electrode 42, while transparent insulating films 48 are formed on the upper ITO electrode 40. The transparent insulating films 48 are formed in a staggered state with respect to the transparent insulating films 46. An alignment layer (not shown) is formed between the liquid crystal 44 and the ITO electrode 40 (or the transparent insulating films 48) and between the liquid crystal 44 and the ITO electrode 42 (or the transparent insulating films 46).

In FIG. 9B, each transparent insulating film 46 covers most of one pixel. The broken lines indicate the lines of the electric force created when a voltage is applied between the ITO electrodes 40 and 42. Because of the transparent insulating films 46 and 48, the lines of electric force incline in the direction perpendicular to the ITO electrode 40.

In this manner, the transparent insulating films 46 formed on one substrate are located in a staggered state with respect to the transparent insulating films 48 formed on the other substrate, so that the orientations of the electric field can greatly vary in the pixel region when a voltage is applied between substrates.

In FIG. 9C, the upper ITO electrode 40 faces a lower striped ITO electrode 43, with a space being maintained, and the liquid crystal 44 is sealed between the upper ITO electrode 40 and the lower ITO electrode 43. The insulating film 48 facing the striped ITO electrode 43 is formed on the upper ITO electrode 40. A horizontal alignment layer (not shown) is formed between the liquid crystal 44 and the ITO electrode 40 (or the insulating film 48) and between the liquid crystal 44 and the striped ITO electrode 43.

In FIG. 9C, one single transparent insulating film 48 covers most of one pixel. The broken lines in FIG. 9C indicate the lines of electric force caused when a voltage is applied between the ITO electrodes 40 and 43. Because of the insulating film 48, the lines of electric force incline in the direction perpendicular to the ITO electrode 40.

Since the transparent insulating film 48 is formed on only one of the substrates while the other substrate is formed by the narrow striped ITO electrode 43, the orientations of the electric field in the pixel region can be greatly varied.

As shown in FIGS. 9A, 9B, and 9C, according to the technique of patterning insulating structures such as the transparent insulating films 46 and 48 to pixels, the insulating structures are not restricted by the pitch of the pixels, and a pattern can be constantly formed with the optimum width and pitch for the orientation of the liquid crystal. Furthermore, the insulating patterns do not need to be joined to one another, but can be independent of one another, allowing more freedom in design.

In the structure shown in FIG. 9B, the liquid crystal 44 is made of a negative nematic liquid crystal, such as MJ961213 (manufactured by Merck & Co. Inc.), and the alignment layers are made of a vertical alignment layer, such as JALS-684 (manufactured by JSR Corporation). The width of the transparent insulating films 46 and 48 is 55 µm, and the gap between the transparent insulating films 46 and 48 is 5 µm. In this case, no rubbing process is performed on the alignment layers, still, excellent liquid crystal orientation can be obtained, and no display unevenness occurs.

Figure 11:
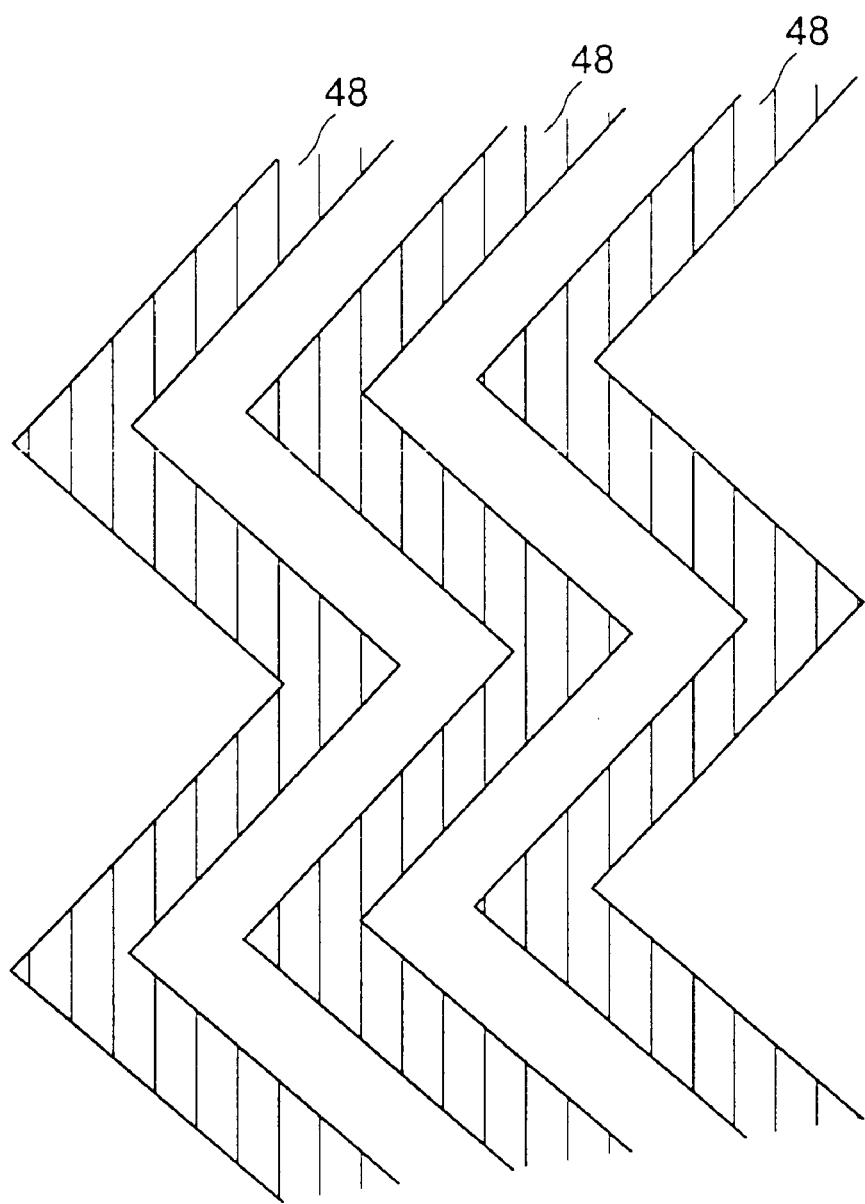
FIG. 11 shows a zigzag pattern of a transparent insulating film.

In the structure shown in FIG. 9B, the transparent insulating films 46 and 48 are striped, as shown in FIG. 11, and bent at 90 degrees by every predetermined length in a zigzag pattern. The display characteristics of such a case were measured, and the viewing angle characteristics shown in FIG. 12 were obtained. The viewing angle characteristics shown in FIG. 12 were far better than the viewing angle characteristics of the conventional TN liquid crystal shown in FIG. 13.

In this manner, when the striped insulating layers are zigzag-patterned, the electric field orientations are varied with a voltage applied between the substrates. Further, the viewing angle characteristics are improved, and the gray level inversion is limited.

Figure 12:
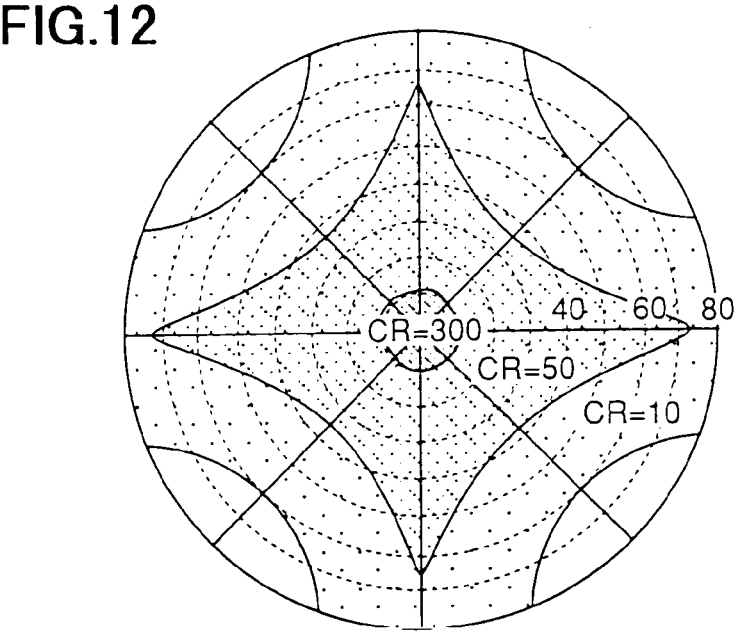
FIG. 12 illustrates the viewing angle characteristics of a device in accordance with the present invention.
Figure 13:
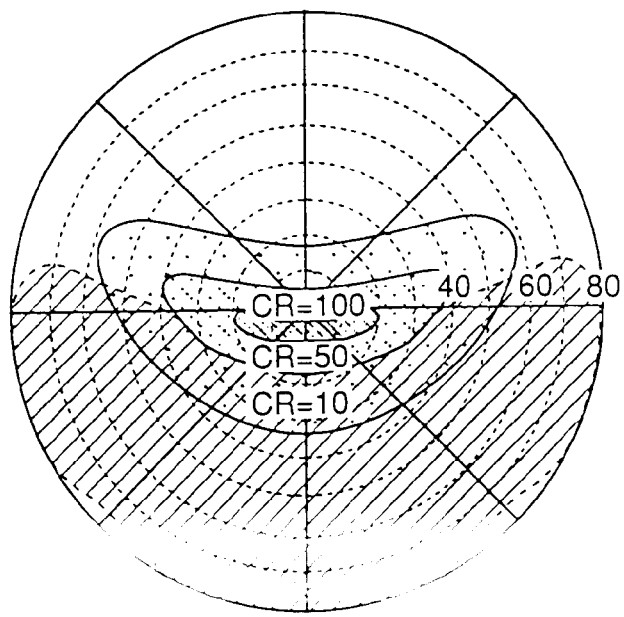
FIG. 13 shows the viewing angle characteristics of a conventional device (TN)

Although the gap width of the pattern is 5 µm and the pattern width is 55 µm, no display unevenness due to a voltage drop is found, and an excellent image display is obtained. In FIGS. 12 and 13, CR indicates the value of contrast.

Figure 14:
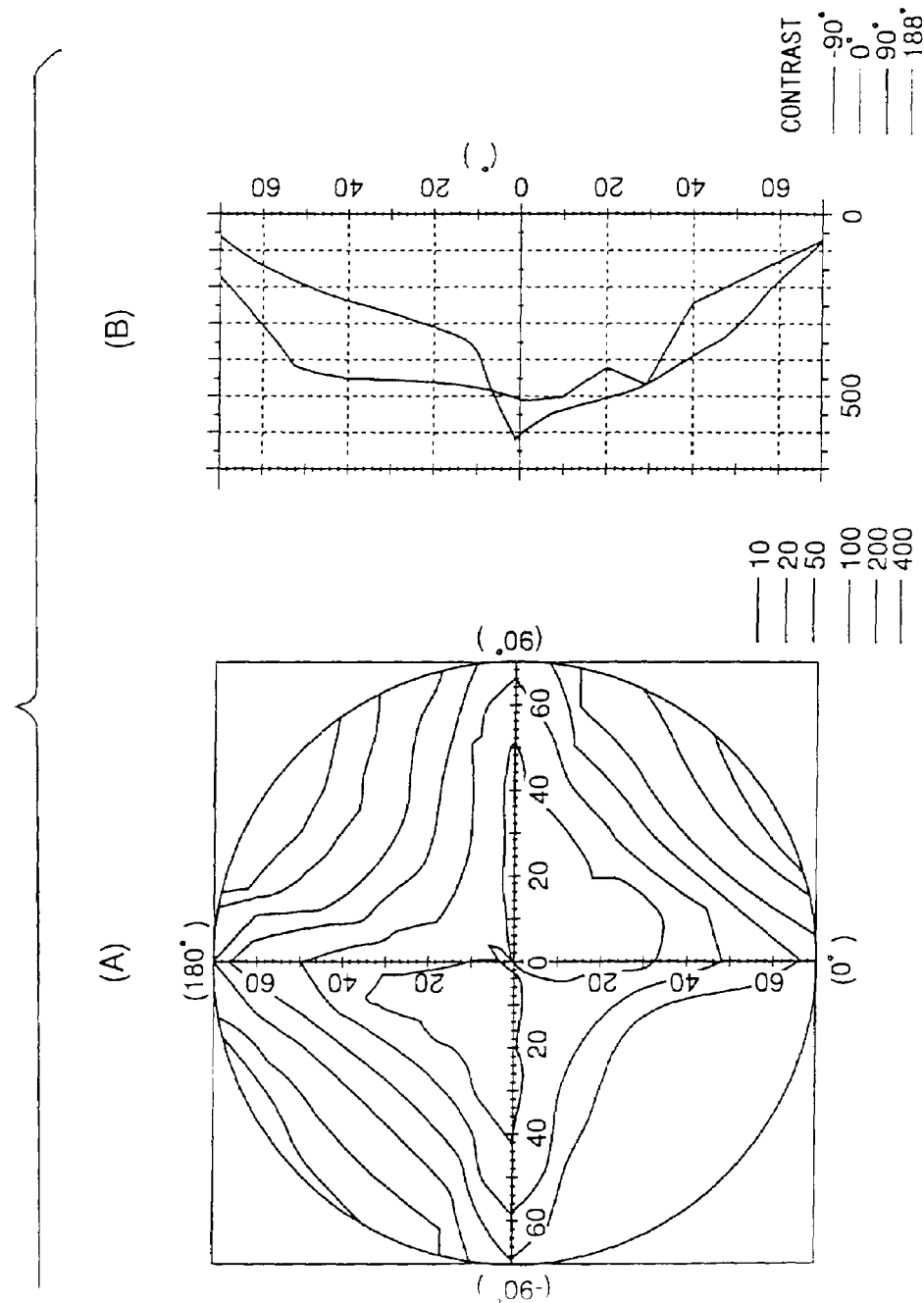
FIG. 14 shows the viewing angle characteristics of the device in accordance with the present invention.

In the structure shown in FIG. 9C, the liquid crystal 44 is made of a nematic liquid crystal material with a positive dielectric constant, such as ZLI-4792 (manufactured by Merck Co. Inc.), and the alignment layers are made of horizontal alignment layer, such as AL-1054 (manufactured by JSR Corporation). The width of the striped ITO electrode 43 is 5 µm, the width of the transparent insulating films 46 and 47 is 55 µm, and the gap between the transparent insulating films is 5 µm. In this structure, a rubbing process in the longitudinal direction of the striped ITO electrode 43 was performed on the horizontal alignment layer to obtain the viewing angle characteristics shown in FIG. 14.

In the above embodiment, the present invention is applied to a transmission type. However, it should be understood that the present invention may also be applied to a reflective display. Either one of the electrodes 40 and 42 of any of the structures shown in FIGS. 9A, 9B, and 9C can be made of metal, and the metal electrode can be used as a reflecting plate, thereby obtaining a reflection-type panel.

Figure 15:
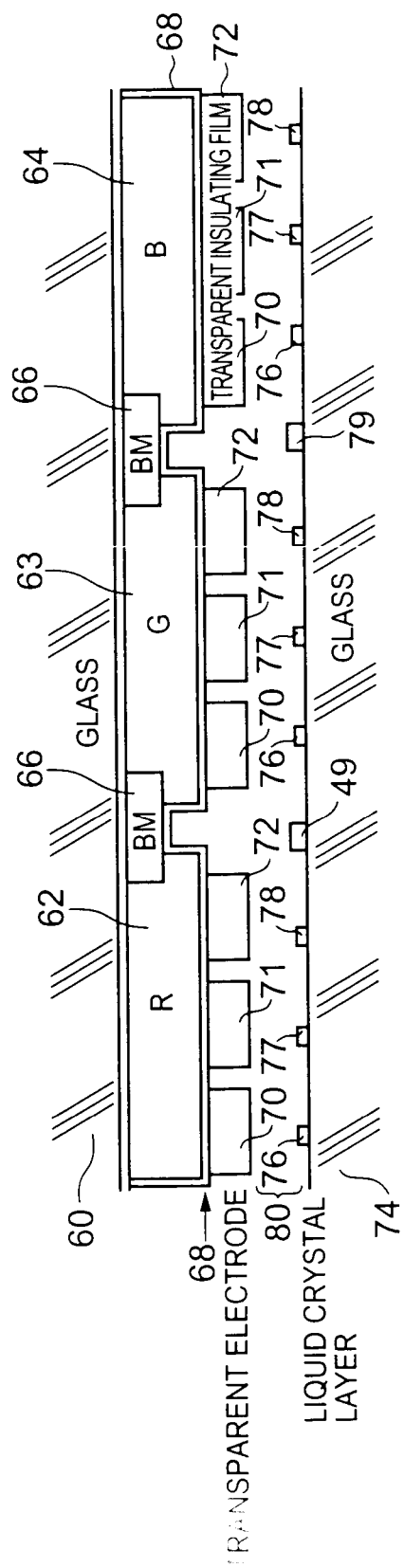
FIG. 15 is a sectional view of a first embodiment of a liquid crystal display device in accordance with the present invention.
Figure 16:
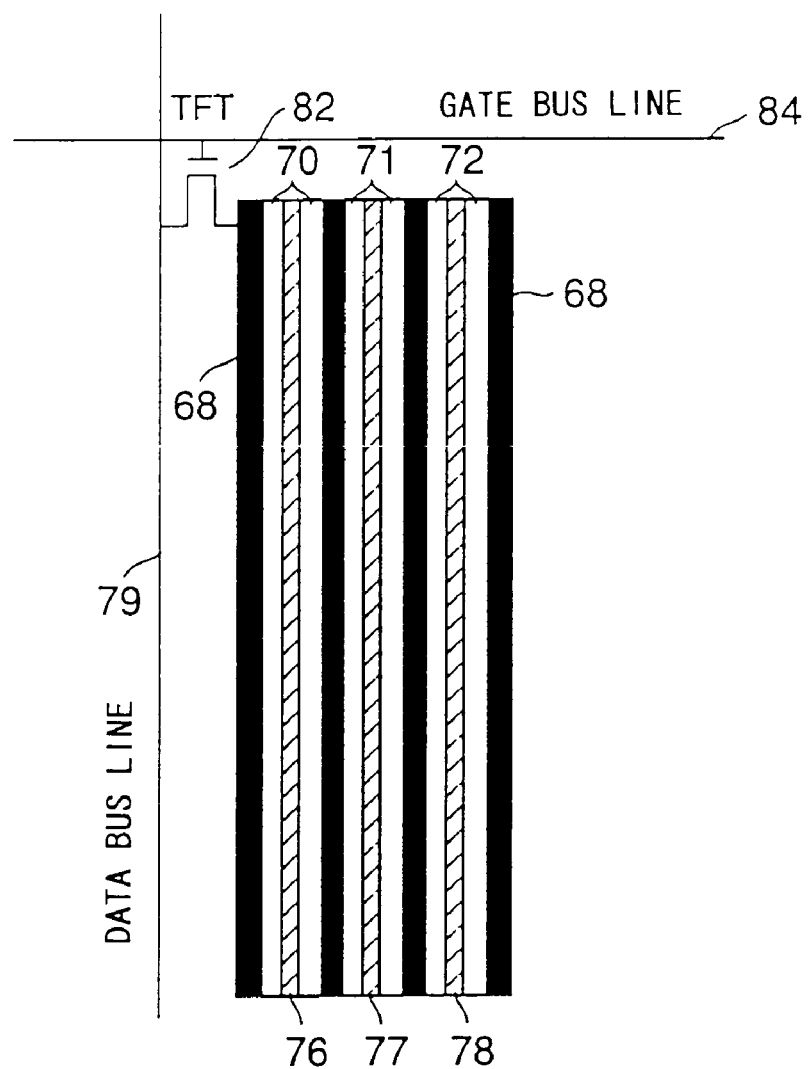
FIG. 16 is a plan view of the first embodiment of the liquid crystal display device in accordance with the present invention.

FIG. 15 is a sectional view of a first embodiment of a liquid crystal display device of the present invention. FIG. 16 is a plan view of the structure of the first embodiment. This embodiment corresponds to the structure shown in FIG. 9C. In FIG. 15, RGB color filters 62, 63, and 64 are formed separately from each other by black matrixes on one surface of the glass substrate 60. A transparent electrode (ITO electrode) 68 is formed on each of the color filters 62, 63, and 64. Further, transparent insulating films 70, 71, and 62 are formed separately from each other on the transparent electrode 68 on each color filter.

Meanwhile, the transparent electrodes (or metal electrodes) 76, 77, and 78 are formed on one surface of the glass substrate 74, facing the transparent insulating films 70, 71, and 72. Also, a data bus line 79 is formed to face each corresponding one of the black matrixes 66. Liquid crystal 80 is sealed between the glass substrates 60 and 74.

A shown in FIG. 16, the gate of a TFT 82 is connected to a gate bus line, the source of the TFT 82 is connected to the data bus line 79, and the drain of the TFT 82 is connected to the transparent electrode 68. In this manner, the transparent insulating films 70, 71, and 72 are formed independently of each other, so as to facilitate the injection process of liquid crystal when the liquid crystal is charged between the facing glass substrates.

Figure 17:
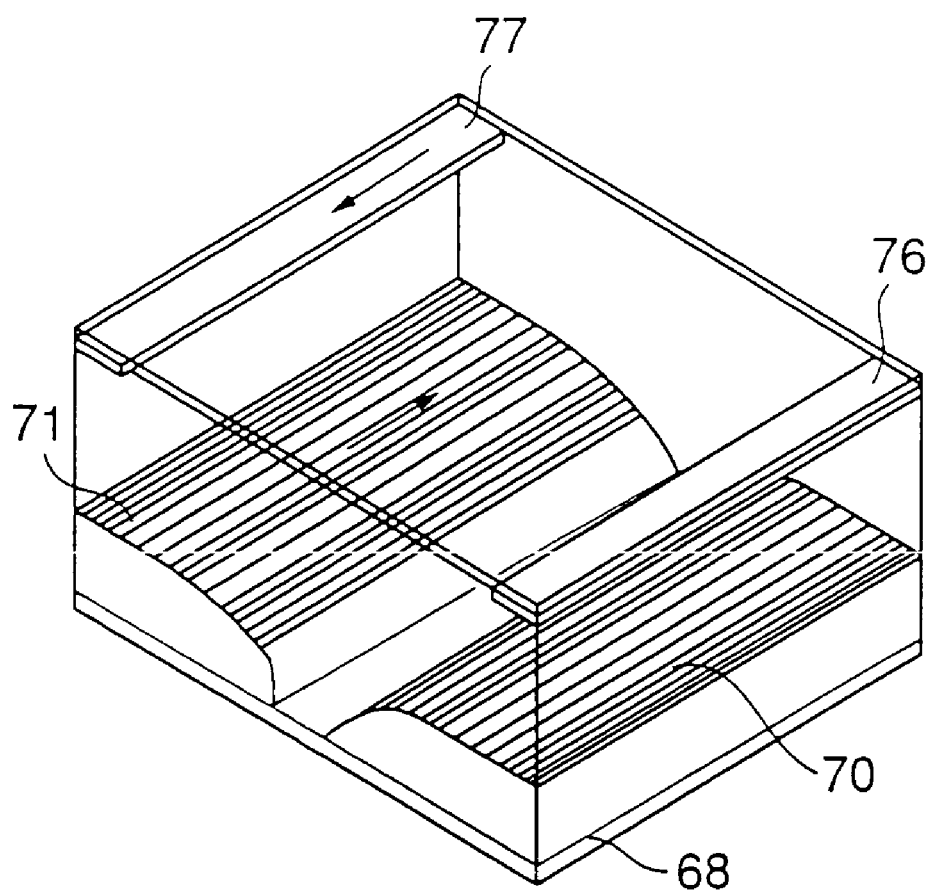
FIG. 17 is a perspective view of transparent insulating films and transparent electrodes.

FIG. 17 is a perspective view of the transparent insulating films 70 and 71, and the transparent electrodes (or the metal electrodes) 76 and 77. In FIG. 17, the structure is shown upside-down, compared with the structure shown in FIG. 15. However, the horizontal alignment layers formed on the side of the transparent insulating films 70 and 71 are subjected to rubbing in the direction of the arrow in the figure, while the horizontal alignment layers formed on the side of the transparent electrodes 76 and 77.

Figure 18:
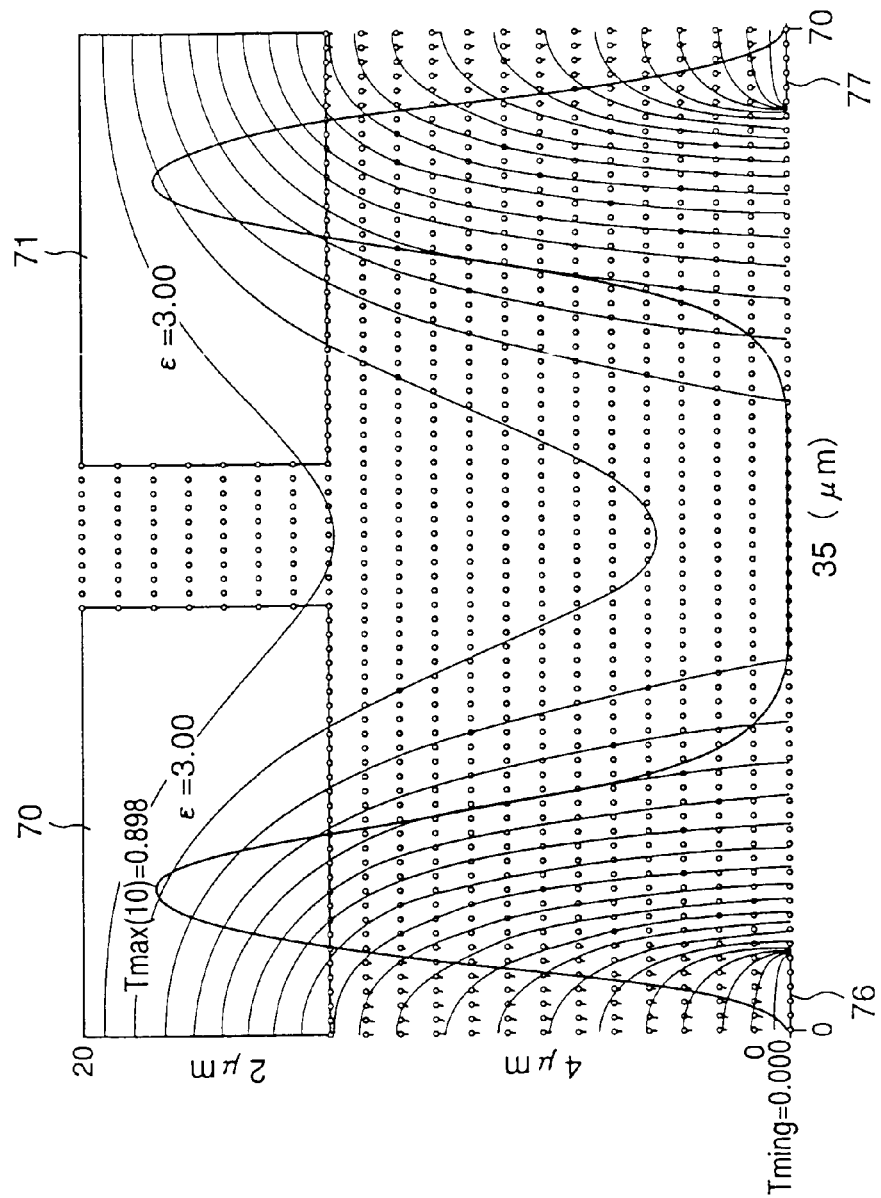
FIG. 18 illustrates a situation when a voltage is applied between the transparent electrodes.

FIG. 18 illustrates a situation in which a voltage of 5 V is applied between the transparent electrode 68 and the transparent electrodes 76 and 77. In this figure, the narrow solid lines indicate equipotential surface that represents the electric field distribution. The circles indicate liquid crystal molecules, and the circles with wedges indicate the inclination of the liquid crystal molecules due to the electric field. The thick solid lines indicate the light transmittance with the inclination of the liquid crystal molecules.

Figure 19:
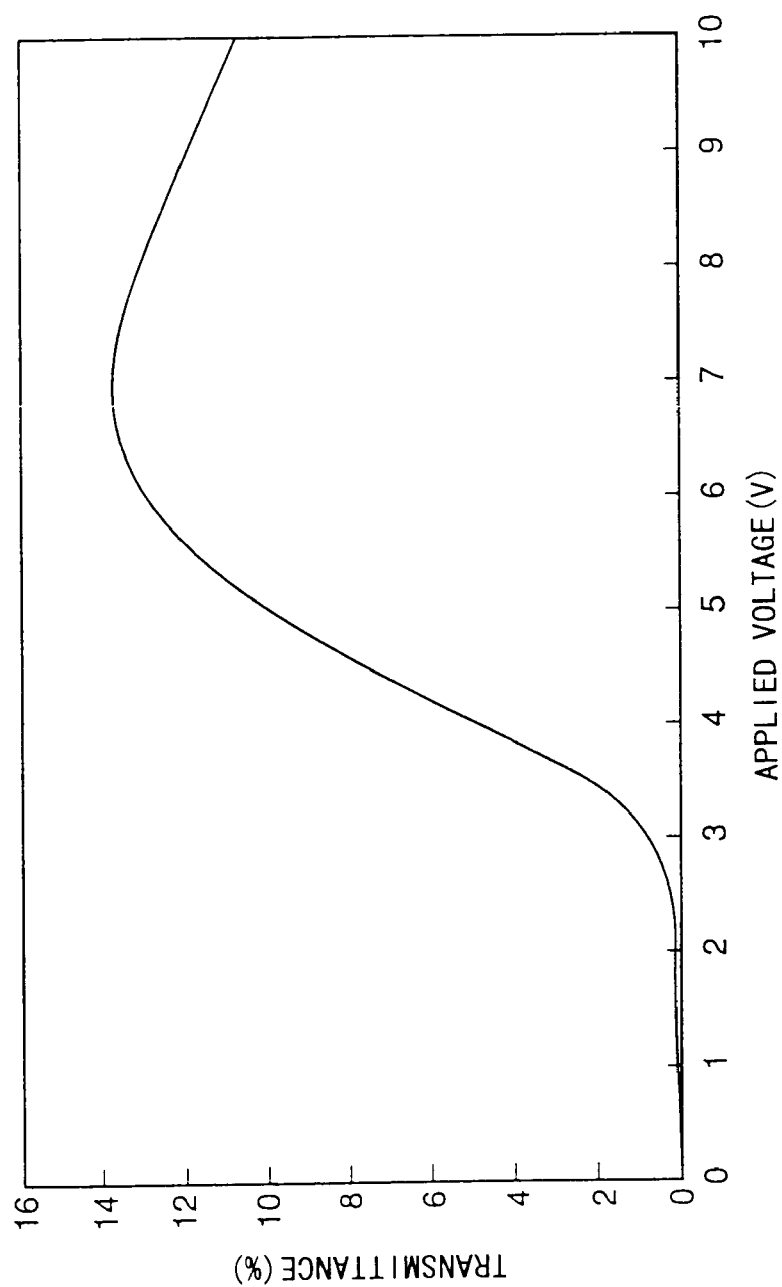
FIG. 19 shows the relationship between the applied voltage and light transmittance.

FIG. 19 shows the relationship between the light transmittance and the voltage applied between the transparent electrode 68 and the transparent electrodes 76 and 77. Here, the horizontal alignment layer is made of AL3506, and the liquid crystal is made of positive nematic liquid crystal, ZLI-4792 (manufactured by Merck & Co. Inc.).

Figure 20:
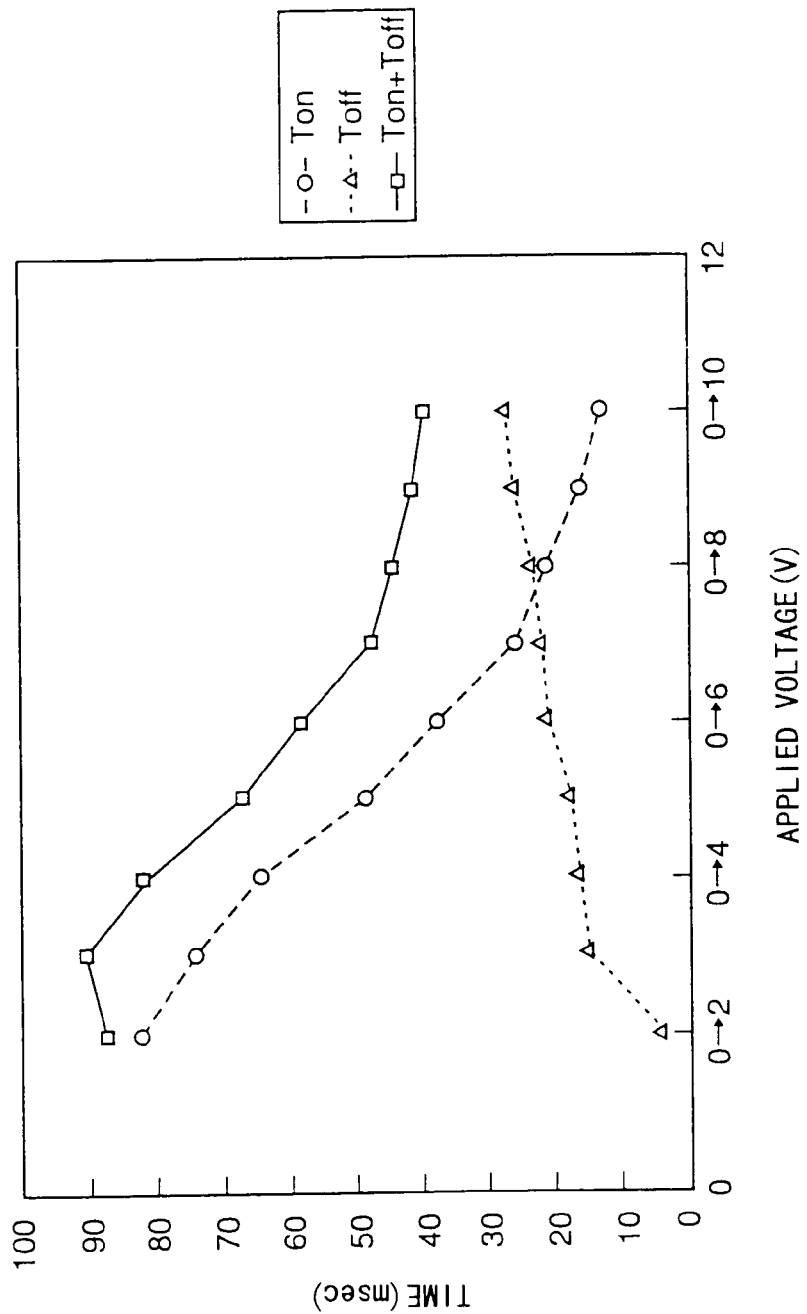
FIG. 20 shows a response time when the applied voltage is changed.
Figure 21:
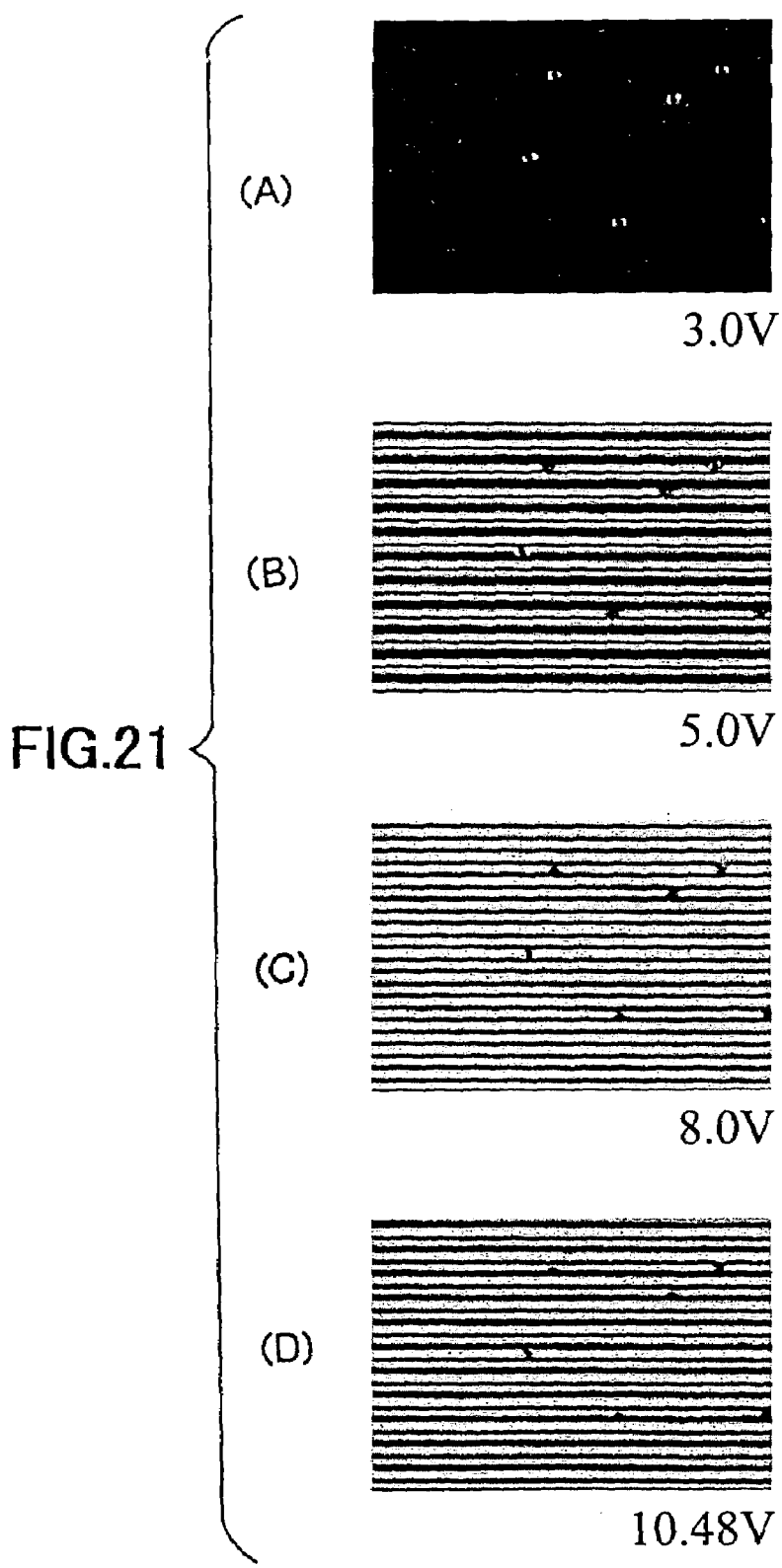
FIG. 21 shows a microscopic pictures of a test cell when the voltage is variable.
Figure 22:
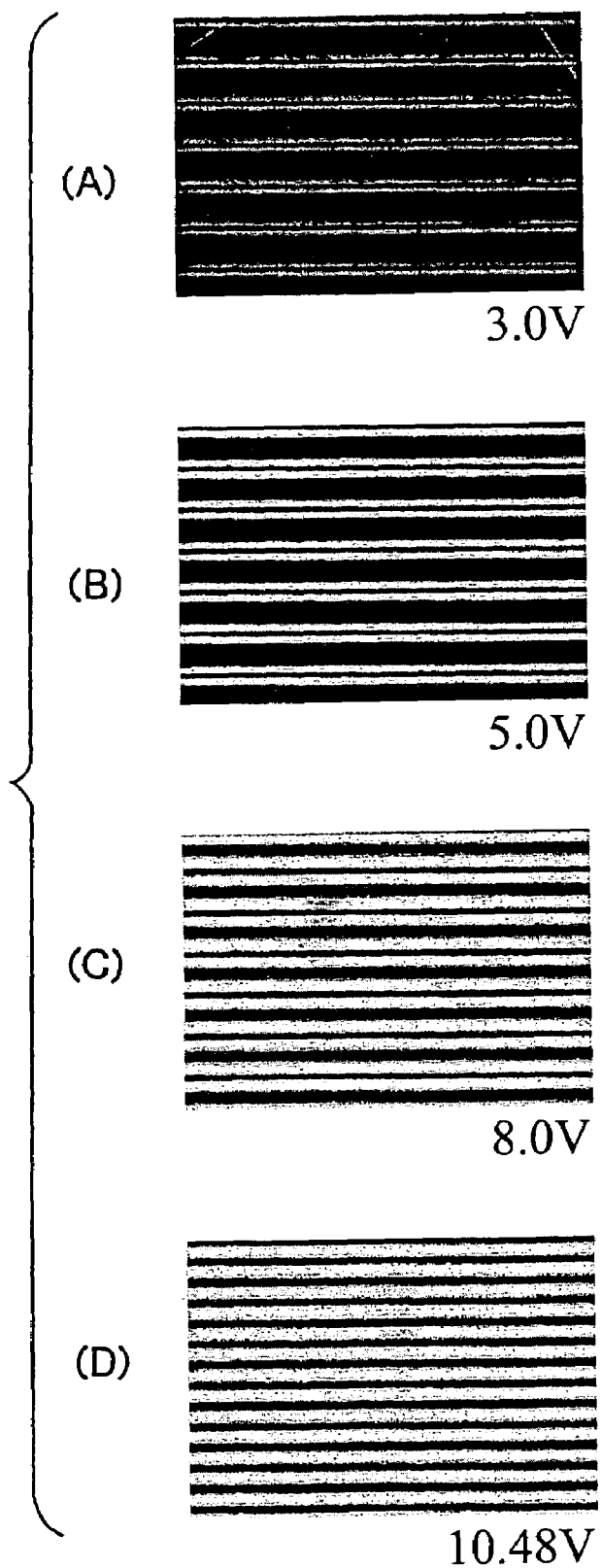
FIG. 22 shows a microscopic pictures of a different test cell when the voltage is variable.
Figure 23:
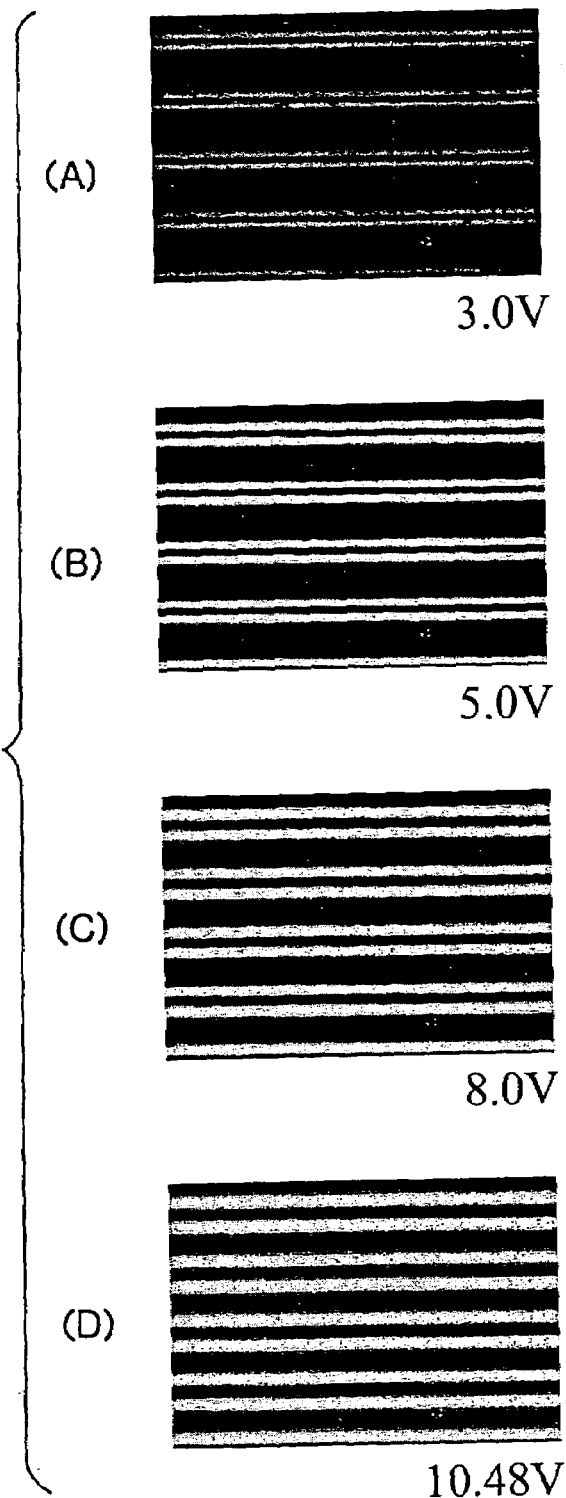
FIG. 23 shows a microscopic pictures of a yet another test cell when the voltage is variable.

FIG. 20 shows each response time [msec] in cases where the applied voltage is changed from 0 V to 2 V, 0 V to 4 V, 0 V to 6 V, 0 V to 8 V, and 0 V to 10 V. In this figure, each circle indicates a turn-on response time (a change from black to white), each triangle indicates a turn-off response time (a change from white to black), and each square indicates a total turn-on and turn-off response time. Here, the longest total response time is 90 msec or shorter, and the shortest total response time is approximately 50 msec. This is an improvement, compared with the case of an IPS in which the longest total response time is 100 msec or longer, and the quickest total response time is 60 msec.

FIGS. 21A to 21D illustrate display conditions in cases where the width of each of the transparent electrodes 76, 77, and 78 is 3 µm, the gap among the transparent electrodes 76, 77, and 78 is 6 µm, and the applied voltage among the transparent electrodes 76, 77, and 78 is changed from 3.0 V to 5.0 V to 8.0 V to 10.48 V. FIGS. 22A to 22D illustrate display conditions in cases where the width of each of the transparent electrodes 76, 77, and 78 is 5 µm, the gap among the transparent electrodes 76, 77, and 78 is 10 µm, and the applied voltage among the transparent electrodes 76, 77, and 78 is changed from 3.0 V to 5.0 V to 8.0 V to 10.48 V. FIGS. 23A to 23D illustrate display conditions in cases where the width of each of the transparent electrodes 76, 77, and 78 is 7.5 µm, the gap among the transparent electrodes 76, 77, and 78 is 15 µm, and the applied voltage among the transparent electrodes 76, 77, and 78 is changed from 3.0 V to 5.0 V to 8.0 V to 10.48 V.

The liquid crystal is generally driven by alternating current waveform, but with an improvement in the response speed, it is necessary to take into consideration the influence in 1 frame (in which a direct current is supplied), i.e., the influence from the direct current waveform. Accordingly, the driving characteristics of the liquid crystal show both the alternating current characteristics and the direct current characteristics. Therefore, the conditions of both characteristics need to be satisfied.

In view of this, the transparent insulating films 46 and 48 employed to exert a desired influence on the driving characteristics of the liquid crystal need to be set under predetermined conditions. More specifically, the transparent insulating films 46 and 48 need to be set in such a manner as to lower the electric field either in terms of the alternating current characteristics or the direct current characteristics. In terms of the direct current characteristics, the specific resistance ρ needs to be high enough to exert an influence on the resistance of the liquid crystal layer. In other words, to set a value equivalent to or higher than the specific resistance of the liquid crystal (for instance, the liquid crystal for TFT driving is $10^{12}$ Ω cm or higher), the specific resistance ρ needs to be $10^{12}$ Ωcm or higher, and more preferably, $10^{13}$ Ωcm or higher.

In terms of the alternating current characteristics, the transparent insulating films 46 and 48 need to have the capacity values (which are determined from the dielectric constant ε and the sectional area) equal to or lower than the capacity value of the liquid crystal 44 (i.e., a value equal to or higher than one tenth as an impedance).

Accordingly, the influence on the electric field distribution can be obtained, as well as the effects in the shape formed by the inclined surfaces of the transparent insulating films 46 and 48. Thus, more stable and rigid alignments can be achieved. The liquid crystal molecules that are aligned vertically in this situation stably exist and act as separation walls for the domains generated on both sides. When a higher voltage is applied, the liquid crystal in the transparent insulating films also start inclining. However, the domains formed on both sides of the transparent insulating films 46 and 48 act as partition walls for the liquid crystal molecules on the transparent insulating films 46 and 48, and the liquid crystal in the center of the multidomain incline in the direction substantially in parallel with the stripes of the transparent insulating films 46 and 48, thereby obtaining a very firm orientation. To realize such a situation, the capacity value of the transparent insulating films 46 and 48 in the multidomain needs to be equal to or smaller than 10 times the capacity value of the liquid crystal 44. Accordingly, the material for the transparent insulating films 46 and 48 should preferably have a small dielectric constant ε and a large film thickness. More specifically, the dielectric constant ε may be approximately 3, and the film thickness of the insulating films may be 0.1 µm or larger. With an even smaller dielectric constant ε and thicker insulating films, more preferable functions and effects can be obtained. In this embodiment, a novolak resist having the dielectric constant ε of 3 and having protrusions of 1.5 µm in film thickness were used for the aligned multi domain creation. As a result of this observation, it was found that a very stable alignment was achieved. With such insulating films being employed for the insulating films 46 and 48 on both sides, further preferable functions and effects can be obtained. Besides the novolak resist, an acrylic resist (ε=3.2) was measured, and the obtained results were substantially the same as in the case of the novolak resist.

Figure 24:
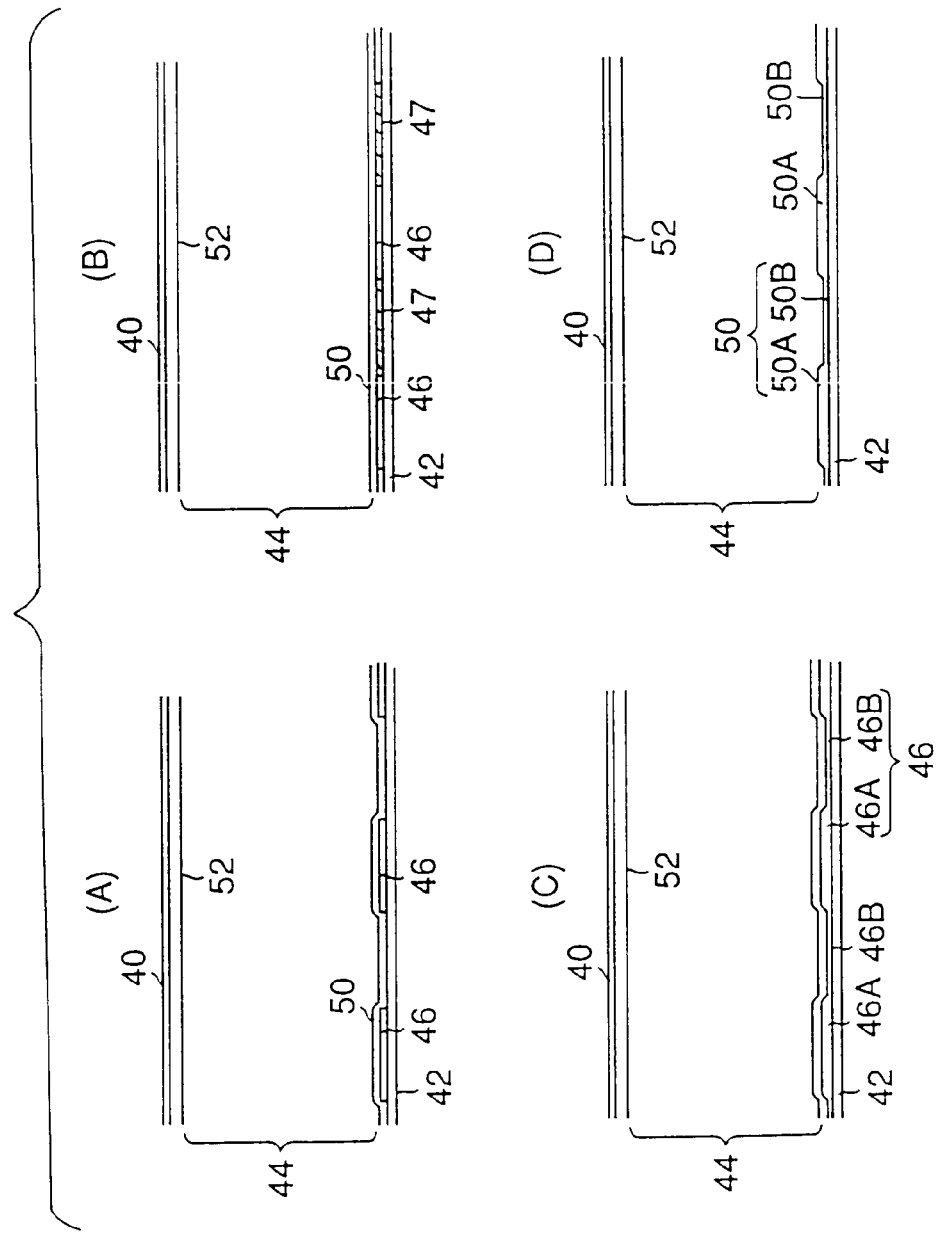
FIG. 24 illustrates a modification of the sectional structure of the present invention.

Next, modifications of the sectional structures shown in FIGS. 9A and 9B will be described. FIG. 24A shows a sectional structure similar to the structure shown in FIG. 9A. Vertical alignment layers 50 and 52 are shown in FIG. 24A. In a modification shown in FIG. 24B, the transparent insulating films 46 made of SiN or the like are uniformly formed on the ITO electrode 42. After that, processes such as ultraviolet ray irradiation on a shadowed portion 47 that is a part of the transparent insulating film 46, thereby making the dielectric constant of the shadowed portion 47 smaller than the dielectric constant (ε=3) of the transparent insulating films 46. By doing so, the lines of electric force at the time of voltage application is bent in the same manner as in FIG. 9A.

In the modification shown in FIG. 24C, the transparent insulating films 46 having thick portions 46A and thin portions 46B are formed on the ITO electrode 42, and the lines of electric force at the time of voltage application is bent in the same manner as in FIG. 9A. In the modification shown in FIG. 24D, the transparent insulating films 46 are not formed on the ITO electrode 42, but a vertical alignment layer 52 having thick portions 52A and thin portions 52B is formed directly on the ITO electrode 42. The lines of electric force at the time of voltage application is bent in the same manner as in FIG. 9A, in accordance with the locations of the transparent insulating films 46 shown in FIG. 24A.

Figure 25:
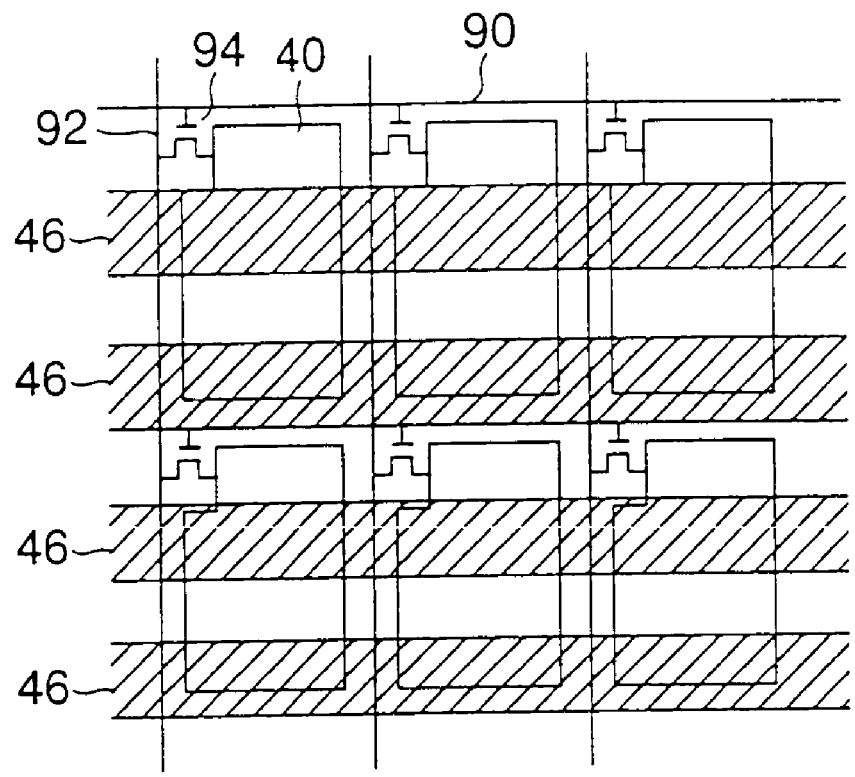
FIG. 25 is a plan view showing a modification of the transparent insulating film in accordance with the present invention related to the modification shown in FIG. 24.

As shown in FIG. 25 by shadowed portions, two transparent insulating films 46 are formed for each one pixel, extending in parallel with the gate bus line 90. Further in FIG. 25, the gate of each TFT 94 is connected to the gate bus line 90, the source of each TFT 94 is connected to the data bus line 92, and the drain of each TFT 94 is connected to the ITO electrode 40.

Figure 26:
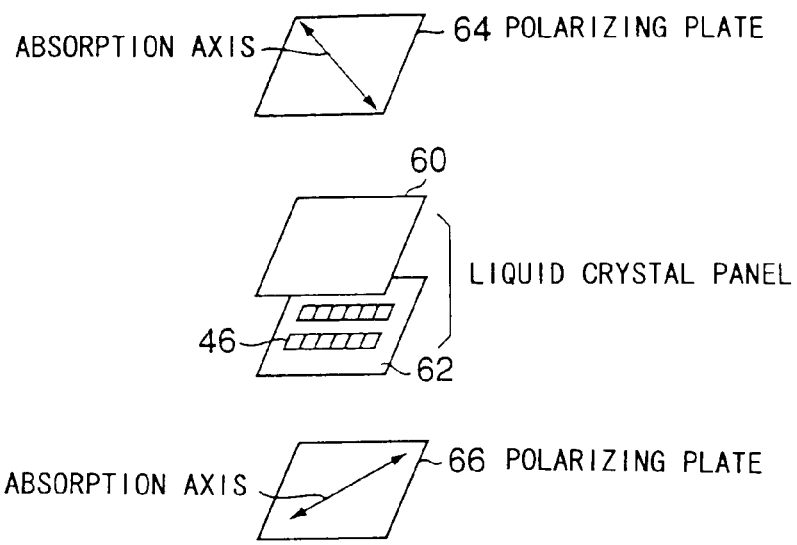
FIG. 26 is an exploded perspective view of a modification of the present invention.

As shown in FIG. 26, the glass substrates 60 and 62 having the ITO electrodes 40 and 42 and the vertical alignment layers 50 and 25 formed thereon face each other, with a predetermined space being maintained by a spacer. The liquid crystal is then sealed between the glass substrates 60 and 62. The polarizing plates 64 and 66 are arranged in such a manner that the absorption axes cross each other at an angle of 90 degrees.

Here, the vertical alignment layer 52 formed on a color filter is produced by transfer-printing and baking a vertical orientation material, JALS-204 (manufactured by Japan Synthetic Rubber, Co., Ltd.). The transparent insulating films 46 on the side of the TFTs 94 are produced by transfer-printing, exposing, developing and then patterning a photosensitive polyimide material. The vertical alignment layer 50 is produced by transfer-printing and baking a vertical alignment material JALS-204 (manufactured by Japan Synthetic Rubber, Co., Ltd.). The glass substrates 60 and 62 are attached to each other, with a spacer having a diameter of 3.5 μm being interposed therebetween. A negative liquid crystal having a negative dielectric anisotropy is then sealed between the glass substrates 60 and 62.

Figure 27:
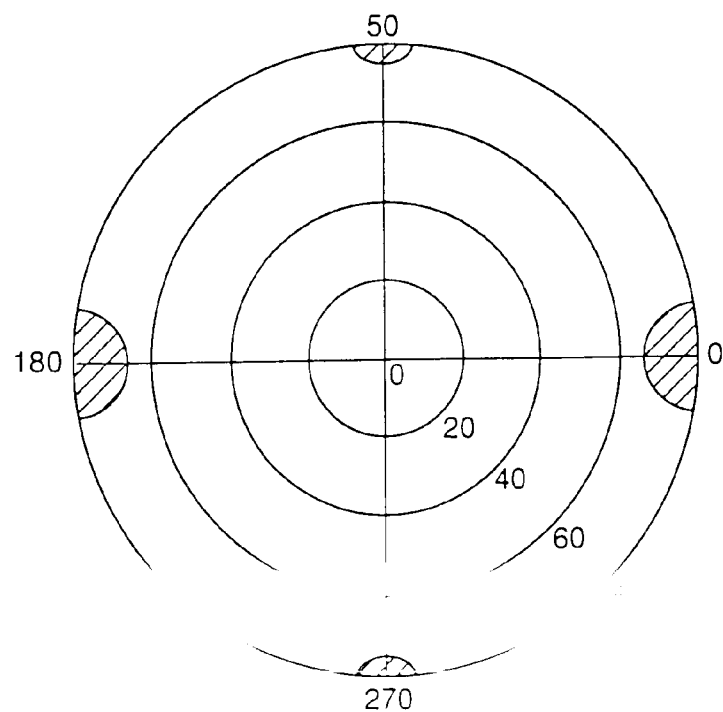
FIG. 27 shows the viewing angle characteristics of the present invention.
Figure 28:
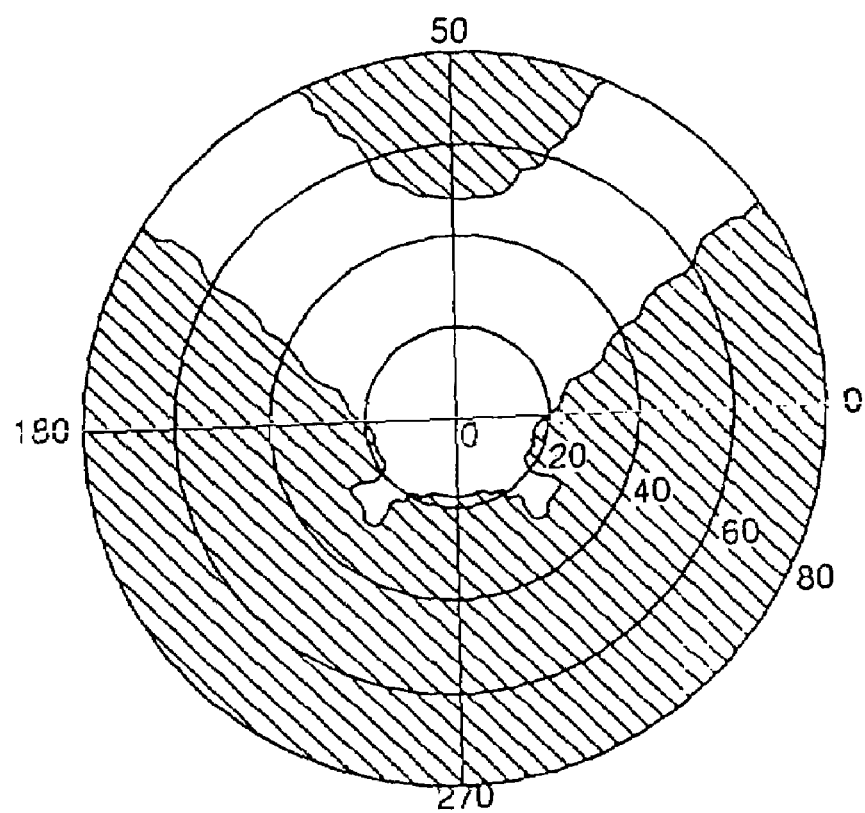
FIG. 28 shows the viewing angle characteristics of the prior art.

The angle regions having gray-level inversion in this case are represented by the shadowed portions in FIG. 27. The angle regions having gray-level inversion in the conventional TN-type liquid crystal display device are represented by the shadowed portions in FIG. 28. From FIGS. 27 and 28, it is apparent that the angle regions having gray-level inversion are much smaller in this embodiment.

Since the liquid crystal has the negative dielectric anisotropy, a transparent film having optically negative uniaxial properties in the normal film direction (which satisfies the equation $Nx \approx Ny > Nz$, where $Nx$ and $Ny$ represent the refractive factor in the direction of the in-plane of the film, and $Nz$ represents the refractive factor in the direction of the normal direction of the film) is attached to either one of the glass substrates 60 and 62, so as to compensate the optical state at the time of non-voltage application (black display). Thus, the viewing angle characteristics can be further improved. Also, an optically biaxial phase difference film ($Nx > Ny > Nz$) or an optically uniaxial phase difference film ($Nx > Ny \approx Nz$) having positive uniaxial properties in the in-plane of the film may be laminated.

In this manner, in a liquid crystal display device having liquid crystal sealed therein, an insulating layer is formed in a region that is narrower than a pixel region. When a voltage is applied between the pair of substrates, the insulating layer varies the orientations of the electric field in the pixel region. In this structure, when a voltage is applied between the pair of substrates, the liquid crystal molecules become perpendicular to the lines of electric force (in a case of negative liquid crystal) or are located in parallel with the lines of electric force (in a case of positive liquid crystal). Accordingly, the orientations of the electric field vary, and a plurality of inclined orientations exist in the liquid crystal. As a result, a brightness variation becomes smaller when seen from any direction, and the viewing angle characteristics are improved. Thus, gray-level inversion can be restricted.

Also, each insulating layer may have a dielectric constant that is different from that of the surrounding area. Thus, the orientations of the electric field in a pixel region can be varied when a voltage is applied between the pair of substrates.

Further, each insulating layer may have a dielectric substance that has a different thickness from the surrounding area. Thus, the orientations of the electric field in a pixel region can be varied when a voltage is applied between the pair of substrates.

Also, each of the substrates may be provided with an insulating layer in such a manner that the insulating layer formed on one of the substrates is in a staggered arrangement with the insulating layer formed on the other one of the substrates. Thus, the orientations of the electric field can be greatly varied when a voltage is applied between the pair of substrates.

Furthermore, each of the substrates may be provided with a vertical alignment layer, and the liquid crystal may be made of a nematic liquid crystal material with a negative dielectric constant. In this structure, when a voltage is applied between the pair of substrates, the liquid crystal molecules become perpendicular to the lines of electric force, and a plurality of inclined orientations exist in the liquid crystal due to the variation of the orientations of the electric field. Accordingly, a brightness variation becomes smaller when seen from any direction, and the viewing angle characteristics can be improved. Thus, gray-level inversion can be restricted.

Also, an insulating layer may be formed on only one of the substrates, and the electrodes of the other one of the substrates is made narrower than the insulating layer. Thus, the orientations of the electric field in a pixel region can be greatly varied.

Furthermore, each of the substrates may be provided with a horizontal alignment layer, and the liquid crystal may be made of a nematic liquid crystal material with a positive dielectric constant. In this structure, when a voltage is applied between the pair of substrates, the liquid crystal molecules are situated in parallel with the lines of electric force, and a plurality of inclined orientations exist in the liquid crystal due to the variation of the orientations of the electric filed. Accordingly, a brightness variation becomes smaller when seen from any direction, and the viewing angle characteristics are improved. Thus, gray-level inversion can be restricted.

Also, the electric resistivity ρ of each insulating layer may be made higher than the electric resistance of the liquid crystal. Thus, a desired influence can be expected on the electric field distribution of the liquid crystal layer in terms of the direct current characteristics.

Furthermore, the electrode of one of the substrates may be made of metal and serves as a reflecting plate. Thus, a reflection-type display can be obtained.

Also, each insulting film may be a vertical alignment layer that has a thickness different from the surrounding area. Thus, the orientations of the electric field in a pixel region can be greatly varied when a voltage is applied between the pair of substrates.

Furthermore, the impedance of each insulating layer may be equal to or higher than the impedance of the liquid crystal. Thus, a desired influence can be exerted on the electric field distribution in the liquid crystal layer in terms of the alternating current characteristics.

Also, each striped insulating layer may be zigzag-patterned by 90 degrees by the predetermined length. Accordingly, the orientations of the electric field can be further varied when a voltage is applied between the pair of substrates, and the viewing angle characteristics can be further improved. Thus, gray-level inversion can be restricted.

Also, a plurality of insulating layers may be formed independently of one another, thereby facilitating the injection process of the liquid crystal between the substrates.

The invention claimed is:

1. A liquid crystal display device in which a pair of substrates carrying respective electrodes thereon face each other across a liquid crystal layer having a negative dielectric anisotropy, said liquid crystal layer being sealed between the substrates, said liquid crystal display device including an insulating layer that varies electric field orientations in a pixel region when a voltage is applied between the pair of substrates, a pair of polarizers being disposed at respective outer sides of said substrates;

said insulating layer comprising a plurality of insulating patterns each having a dielectric constant different from a dielectric constant of a surrounding area surrounding at least one of said insulating patterns, said plurality of insulating patterns controlling an in-plane direction of liquid crystal molecules in liquid crystal forming said liquid crystal layer in a tilted state in which a voltage is applied across said electrodes, said liquid crystal layer including a first region in which liquid crystal molecules of said liquid crystal layer undergo transition to said tilted state upon application of a first voltage across said electrodes and a second region in which said liquid crystal molecules undergo transition to said tilted state upon application of a second voltage larger than said first voltage in magnitude across said electrodes, a width of said insulating patterns being set larger than a width of a gap between any two adjacent ones of said insulating patterns on the same substrate.

2. The liquid crystal display device as claimed in claim 1, wherein said plurality of insulating patterns are connected with each other by an insulating film in said surrounding area, and wherein each of said plurality of insulating patterns has a thickness different from a thickness of said insulating layer in said surrounding area.

3. The liquid crystal display device as claimed in claim 1, wherein the insulating layer is formed for each of the substrates, and the insulating layer of one of the substrates is arranged in a staggered state with the insulating layer of the other one of the substrates.

4. The liquid crystal display device as claimed in claim 1, wherein a vertical alignment layer is provided for each of the substrates, and the liquid crystal is a nematic liquid crystal with a negative dielectric constant.

5. The liquid crystal display device as claimed in claim 1, wherein the insulating layer is formed only on one of the substrates, and the electrode of the other one of the substrates is made narrower than the insulating layer.

6. The liquid crystal display device as claimed in claim 1, wherein an electric resistance of the insulating layer is higher than an electric resistance of the liquid crystal.

7. The liquid crystal display device as claimed in claim 1, wherein the electrode of one of the substrates is formed by a metal electrode and used as a reflecting plate.

8. The liquid crystal display device as claimed in claim 1, wherein said plurality of insulating patterns are connected with each other by an insulating film in said surrounding area, and wherein each of the insulating patterns comprises a vertical alignment layer that has a thickness different from a thickness of said insulating layer in said surrounding area.

9. The liquid crystal display device as claimed in claim 1, wherein an impedance of the insulating layer is lower than an impedance of the liquid crystal or higher.

10. The liquid crystal display device as claimed in claim 1, wherein the insulating layer is striped.

11. The liquid crystal display device as claimed in claim 10, wherein a plurality of the striped insulating layers are arranged adjacently to one another.

12. The liquid crystal display device as claimed in claim 10, wherein the striped insulating layer is repeatedly bent by a predetermined length in a zigzag state.

13. The liquid crystal display device as claimed in claim 11, wherein a plurality of insulating layers are employed independently of one another.

14. The liquid crystal display device as claimed in claim 1, wherein the insulating layer comprises patterned structures.

15. The liquid crystal display device as claimed in claim 14, wherein the patterned structures are joined to one another.

16. The liquid crystal display device as claimed in claim 14, wherein the patterned structures are independent of one another.

17. The liquid crystal display device as claimed in claim 1, wherein the electrodes are arranged in the absence of slits.

18. The liquid crystal display device as claimed in claim 1, wherein the insulating layer comprises a patterned portion having slits.

19. The liquid crystal display device as claimed in claim 1, wherein the insulating layer comprises a portion which covers at least half the pixel region.

20. The liquid crystal display device as claimed in claim 1, wherein the insulating layer comprises patterned structures that correspond to pixels.

21. The liquid crystal display device as claimed in claim 1, wherein the insulating layer is provided to one of the electrodes.

22. The liquid crystal display device as claimed in claim 1, wherein the insulating layer comprises portions provided to both of the electrodes facing each other.

23. The liquid crystal display device as claimed in claim 1, wherein the substrates are transparent.

24. The liquid crystal display device as claimed in claim 1, wherein said second region has a total area exceeding 50% of a total display area of said liquid crystal display device.

* * * * *

UNITED STATES PATENT AND TRADEMARK OFFICE
CERTIFICATE OF CORRECTION

| | | |
|---|---|---|
| PATENT NO. | : 7,113,240 B2 | Page 1 of 1 |
| APPLICATION NO. | : 09/886636 | |
| DATED | : September 26, 2006 | |
| INVENTOR(S) | : Arihiro Takeda | |

It is certified that error appears in the above-identified patent and that said Letters Patent is hereby corrected as shown below:

In the Drawings:

Delete Fig. 27, and should be replaced with the correct Fig. 27 shown below.

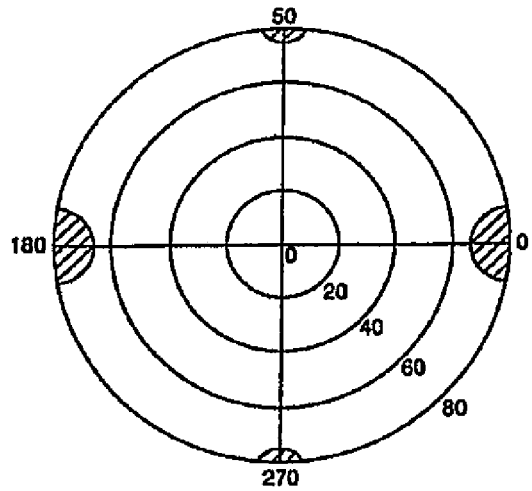

FIG.27

Signed and Sealed this

Twenty-fourth Day of April, 2007

JON W. DUDAS
*Director of the United States Patent and Trademark Office*